United States Patent [19]
Arterburn et al.

[11] Patent Number: 6,062,048
[45] Date of Patent: May 16, 2000

[54] APPARATUS FOR AUTOMATING FIBER MANUFACTURE WITH AUTOMATIC FIBER GATHERING

[75] Inventors: Russell D. Arterburn; Larry Edward Howard, both of Athens, Tenn.

[73] Assignee: Johns Manville International, Inc., Denver, Colo.

[21] Appl. No.: 09/305,268

[22] Filed: May 4, 1999

Related U.S. Application Data

[62] Division of application No. 08/960,119, Oct. 27, 1997, Pat. No. 5,935,289, which is a continuation of application No. 08/604,695, Feb. 21, 1996, abandoned, which is a continuation-in-part of application No. 08/296,212, Aug. 25, 1994, abandoned.

[51] Int. Cl.[7] .................................................. C03B 37/03

[52] U.S. Cl. .............................................. 65/500; 65/453

[58] Field of Search .............................. 65/500, 453, 533, 65/539

[56] References Cited

U.S. PATENT DOCUMENTS

| 3,168,390 | 2/1965 | Theobald | 65/500 |
|---|---|---|---|
| 3,721,061 | 3/1973 | Bodolay . | |
| 3,997,308 | 12/1976 | Drummond | 65/500 |
| 4,071,341 | 1/1978 | Bohy | 65/500 |

*Primary Examiner*—John Hoffmann
*Attorney, Agent, or Firm*—Robert D. Touslee

[57] ABSTRACT

Apparatus and methods of using the apparatus to automate a labor intensive portion of the process of making continuous fiber products, like chopped glass fiber. In this process many fiberizers are used, each fiberizer forming as many as several thousand fibers. Fibers break frequently requiring the fiberizers to be restarted and this has always been a labor intensive part of the process. Apparatus for getting the fiberizers ready to restart quickly and for forming a fiber strand, apparatus for gripping the strand, breaking it and transporting it to strand pulling and processing equipment and apparatus for moving a newly started strand into a desired position on an optional strand separating and guiding means, and methods of using the apparatus are disclosed.

12 Claims, 14 Drawing Sheets

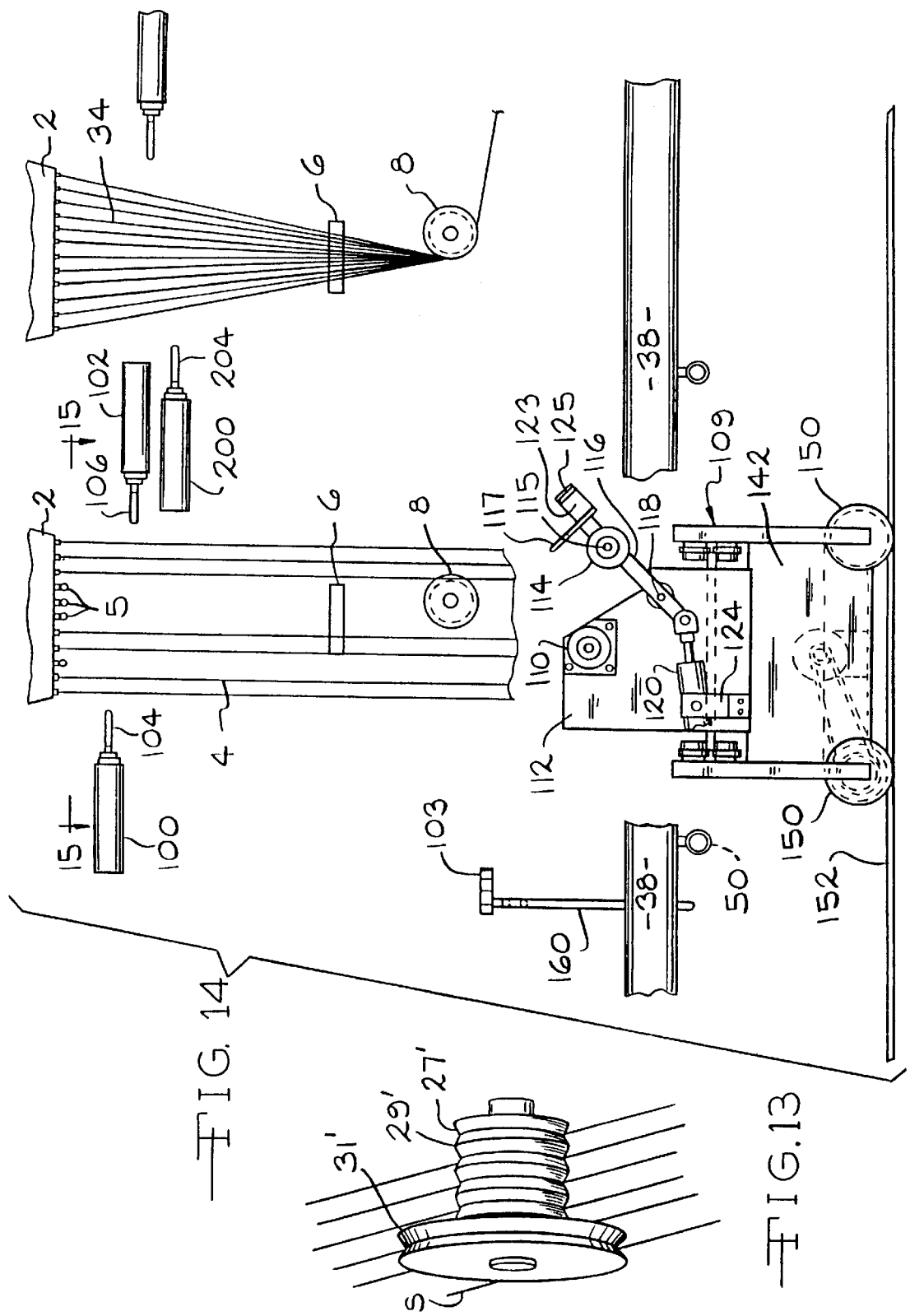

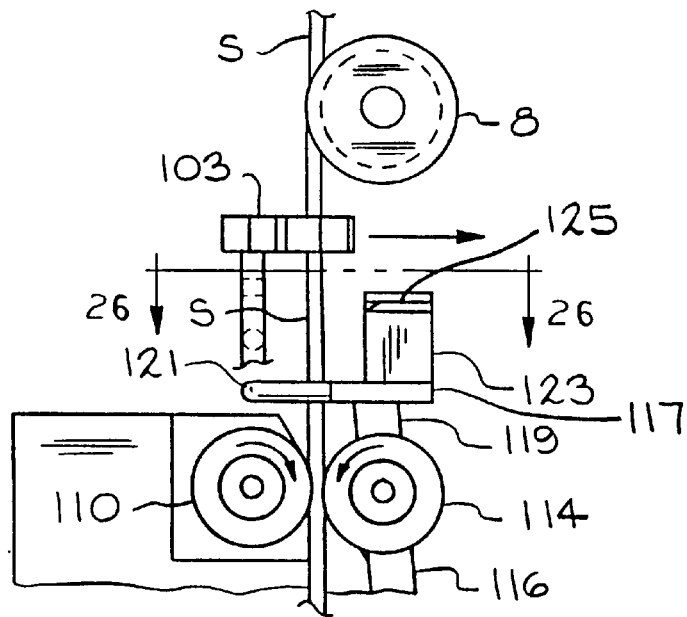
FIG. 25
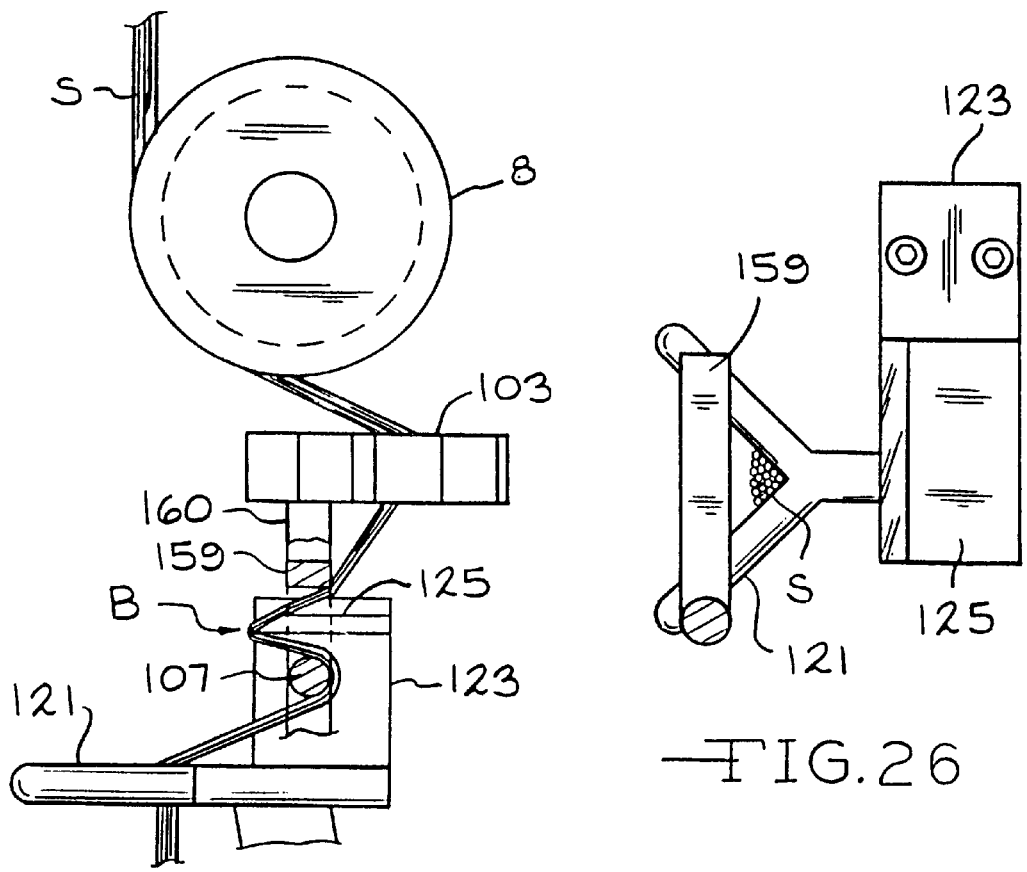
FIG. 27
FIG. 26

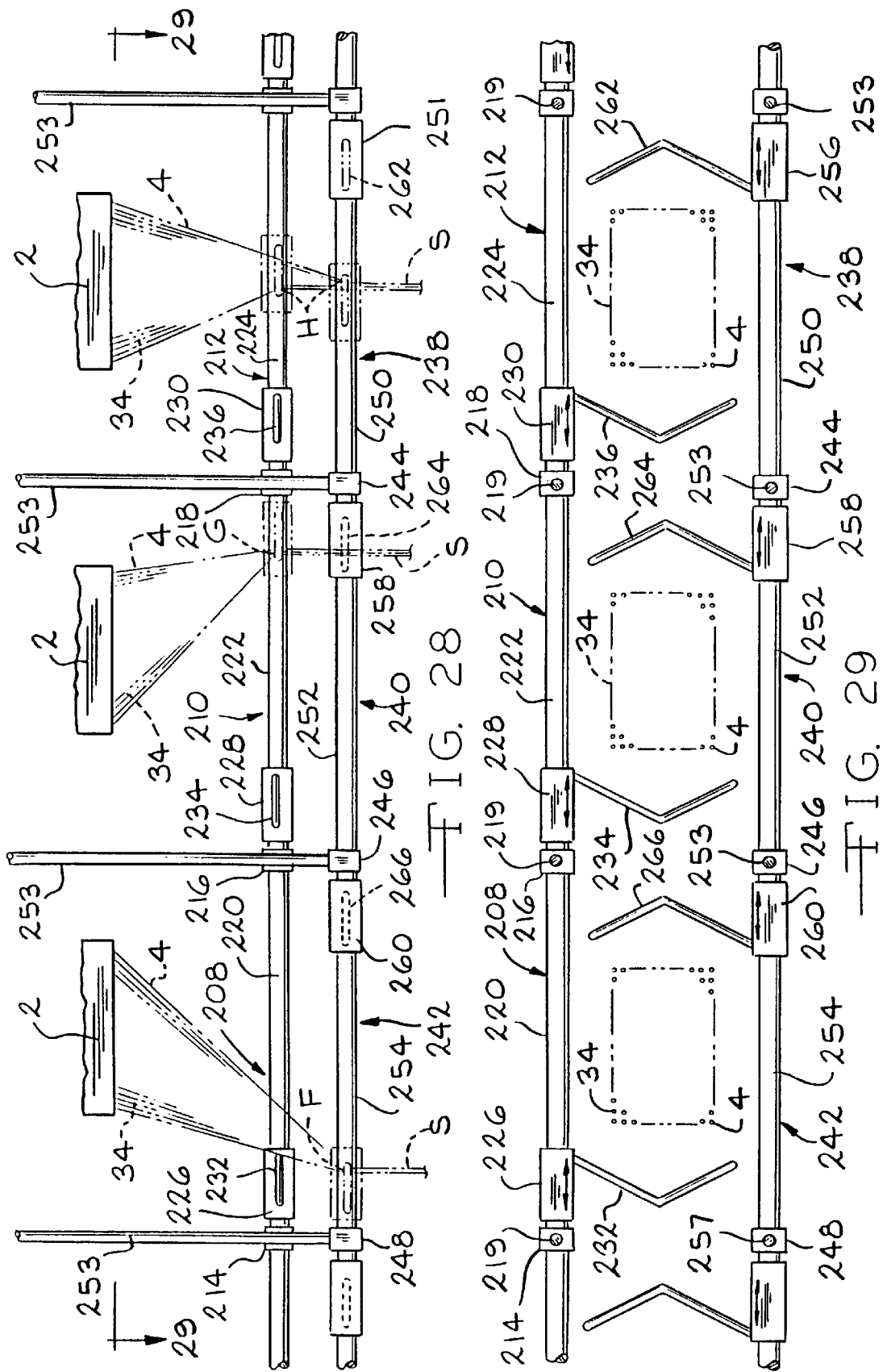

APPARATUS FOR AUTOMATING FIBER MANUFACTURE WITH AUTOMATIC FIBER GATHERING

This application is a division of application Ser. No. 08/960,119, filed Oct. 27, 1997 now U.S. Pat. No. 5,935,289 which application was a continuation of application Ser. No. 08/604,695 filed Feb. 21, 1996, now abandoned, which application was a continuation-in-part of application Ser. No. 08/296,212 filed Aug. 25, 1994, now abandoned.

BACKGROUND

This application is a continuation in part of application Ser. No. 08/296,212. The present invention relates to methods and apparatus for automating the process of making continuous fiber products, such as chopped fiber, rovings, etc.

In the manufacture of chopped fiber, such as glass fiber, molten glass is extruded through tips or holes in the bottom of a metal box or bushing, forming beads at the end of the tips (normally tips are used, but it is also feasible to use a tipless bushing having only holes or holes on raised portions lands on the tip plate—it is to be understood that when the term "tips" is used hereafter what is intended is any of these configurations used to make fiber). When the beads reach a certain size, the surface tension, wetting, and viscosity forces holding the bead to the bottom of the tip are overcome by gravity and the beads fall, trailing a continuous, coarse, primary fiber behind each bead which is attached at its other end to the molten glass in the tip or hole from which the bead came. The primary fibers are usually sprayed with a cooling water mist after they move out of the immediate area below the tip plate of the bushing in a known manner.

Once all of the tips or holes have thus "beaded out", the array of primary fibers from that bushing is ready to be gathered into a fiber bundle, i. e. a strand, and fed into a chopper or other device that will pull the strand of fibers fast enough to attenuate the molten portion of each fiber to the desired fiber diameter and will also chop, wind or otherwise process the strand or strands of fibers into a desired product form. After a bushing has been in service a few weeks or months, the tips get out of alignment with the cooling means and often a few tips will have a lower molten glass flow rate than the other tips. To accelerate the bead down time of these tips the operator will move the array of primary fibers back and forth to attach the slow beads to primary fibers and pull them down to get a primary fiber from all tips and a strand ready to start. Until the primary fibers are started into a puller, chopper, winder, etc., they usually continue to move and fall into a scrap pit or area beneath the floor of the fiber forming room.

The portion of the continuous fiber making process of starting a strand of fibers from all of the tips of a bushing and of transporting and starting strands of fibers into choppers or other processing equipment has always been done by hand and is labor intensive. Thus it is desirable to automate, or partially automate, this portion of the process, not only to reduce labor cost, but more importantly to increase the percentage of time each bushing is making fiber products and to reduce primary fiber waste.

For a number of possible reasons, fibers tend to break all to frequently, usually near the end of the tips in the bushings. Particularly with E type glass, when one fiber breaks it is usually only a matter of a few minutes until the entire bushing is broken out and generating scrap primary fibers. Even in cases where broken fibers do not form beads or break out the remainder of the bushing, by design, it is nevertheless prudent to break out the entire bushing and restart it after a small number of fibers have broken to maximize efficiency and to reduce variation in the product being produced.

Typical methods used in the industry to make continuous chopped fiber products are disclosed in U.S. Pat. Nos. 3,815,461, 4,194,896 and 4,576,621 and the disclosures in these patents are hereby incorporated by reference. In a typical method an operator would stand below and in front of a fiber forming bushing to be restarted. If a part of the bushing is still running good fibers, the operator would break out that portion. As soon as all of the tips have beaded out and primary fibers are being generated from all of the tips, the operator gathers the array of fibers together into a bundle or strand, cuts or breaks the strand to form an end and pulls the fiber array against a sizing applicator and the strand under a pad wheel or guide with a curved surface below the bushing and walks the strand, pulling it, down to a puller, such as a chopper or winder, and feeds it into the pulling mechanism whereby the strand is pulled at the proper speed and chopped continuously into chopped fiber product or wound into a continuous strand package for use in making reinforced plastics, non-woven fiber glass mats, etc. In a typical operation each operator may have responsibility for 10 to 30 or more bushings and each bushing start may require walking at least 20–40 feet to get the strand to the puller or chopper, and in some instances, to the winder, and to walk back to the position or the next position needing attention or starting.

With many bushings typically breaking out (at least 20 fibers broken) at least 1–4 times per hour, especially when the glass quality varies from normal, the operator either doesn't have time to start each bushing as soon as necessary for most efficient operation, or the operator becomes tired and doesn't get the bushings restarted timely. This resultant loss of efficiency and the desire to reduce the labor costs in this process makes it desirable to automate the most labor intensive portions of these processes.

BRIEF DESCRIPTION OF THE INVENTION

The present invention comprises apparatus and methods for automating or partially automating the debeading of a fiber forming bushing where that is necessary and for forming a strand of primary fibers from a debeaded bushing, and also apparatus and methods for automating the transporting and starting of a strand of fibers into a strand puller, such as a chopper or winder.

The present invention also includes apparatus and methods for automatically positioning a newly started strand into an appropriate position on a strand separator and guide means which can be used with the other apparatus or alone.

The present invention comprises an apparatus for use in a process for making continuous strand products, such as chopped glass fiber and rovings, by pulling one or more continuous strands, each strand comprising a multitude of individual fibers formed from molten material by fiber forming means, each strand being pulled partially around a curved surface or wheel means located below and adjacent a vertical projection of each of the fiberizing means, and onto a puller for accelerating the strand to the desired pulling speed after which the fiber is chopped, wound or otherwise processed, said apparatus comprising a gripper for gripping a strand of fibers, said gripper movable from the vicinity below any fiberizing means to the vicinity or close proximity of the strand puller, a transporter for moving said gripper to the vicinity of the puller and back to a vicinity below any fiberizing means or to a home position, a guide for guiding said gripper along a predetermined path between a home position, the vicinities below said fiberizing means and the vicinity of said puller, a releasing mechanism for causing said gripper to release said strand at a predetermined location along said path in the vicinity of said puller, a control system for returning said gripper from the vicinity of the puller to a predetermined location along said path. The invention is used in combination with chopping means for chopping one or more strands continuously into desired lengths, winding means well known in the art for winding strand into packages of known configuration, or other fiber strand processing equipment to form new, automated or partially automated strand starting methods of making fibers.

The apparatus of the present invention also comprises novel equipment for automatically gathering the multitude or array of hanging primary fibers flowing slowly from the fiberizing means, debeading the fiberizing means when necessary, and forming the array of primary fibers into a strand and optionally with means for pulling the strand slowly to prevent the fibers from breaking out until the operator or mechanism arrives to grab the strand and take it to the puller, such as a chopper or winder. Preferably, this apparatus is operated in a way to accelerate and minimize complete bead down time and also preferably, this invention is used in cooperation with the invention that automatically grips the strand, transports it and inserts it into the puller, chopper or winder.

As a further option, the apparatus of the present invention also may include known bushing breakout detection means, for detecting when a bushing has broken out and is ready for restarting, tied into a control system whereby the gripper is transported automatically to the vicinity below the fiberizing means that is ready for restarting. As still a further option the apparatus of the present invention can include novel apparatus to position a newly started strand into a strand separating and guiding mechanism working in cooperation with a chopper or winder, the apparatus comprising, a plurality of strand guides located adjacent said path in the vicinity of said chopper for keeping each strand separated from the other strands, and a strand mover for moving each newly started strand into the proper guide on the strand separation mechanism.

The present invention also includes methods of using the above apparatus in various combinations to make glass fiber products, such as chopped fibers and rovings, at improved production efficiencies. In one method fiber products are made using the debeading and strand forming apparatus in place of the current manual method.

In another method, the strand gripper and transporter apparatus is used to make fiber products in a method using manual debeading and strand forming. In still another method these two new methods are combined.

In still another method of making fiber products the new apparatus described above for moving, a newly started fiber strand into the proper position on a strand separating and guiding mechanism is used in place of moving the strand manually. In other methods, this latter method is combined with one or more of the methods described above.

The above apparatus and methods are applicable to the manufacture of fibers from liquid materials including molten glass.

BRIEF DESCRIPTION OF THE DRAWINGS

FIG. 13 is a partial perspective view of another version of the apparatus shown in FIG. 7 for use with the device of FIG. 9.

FIG. 14 is a vertical view of a fiber forming position showing further apparatus of the present invention for automatically forcing a beaddown and for automatically starting a fiber strand from a fiberizer.

FIG. 23 shows the device in a normal position and also a second or strand pulling position is shown in phantom.

FIG. 25 is a partial vertical front view showing a strand about to be started and sheared by the mechanisms shown in FIG. 24.

FIG. 26 is an enlarged partial front vertical view of a portion of the apparatus shown in FIG. 25 after it has grabbed a strand and started pulling the strand around a wheel and another portion of the strand into a shearing mechanism.

FIG. 27 is a partial cross sectional plan view of a portion of the apparatus shown in FIG. 25 looking along lines 27—27 to show a clearance in the strand shearing mechanism.

FIG. 28 is a front view of another embodiment of the apparatus for forcing a beaddown and forming a fiber strand for the strand starting apparatus. This figure also shows three different fiber array configurations in phantom, which three configurations are the configurations formed by the apparatus under each bushing during each debeading and strand forming operation following each fiber breakout on that bushing.

FIG. 29 is a cross section taken along plane 29—29 in FIG. 28 and shows a plan view of the embodiment for forcing a beaddown and forming a strand shown in FIG. 28.

DETAILED DESCRIPTION

Figure 1:
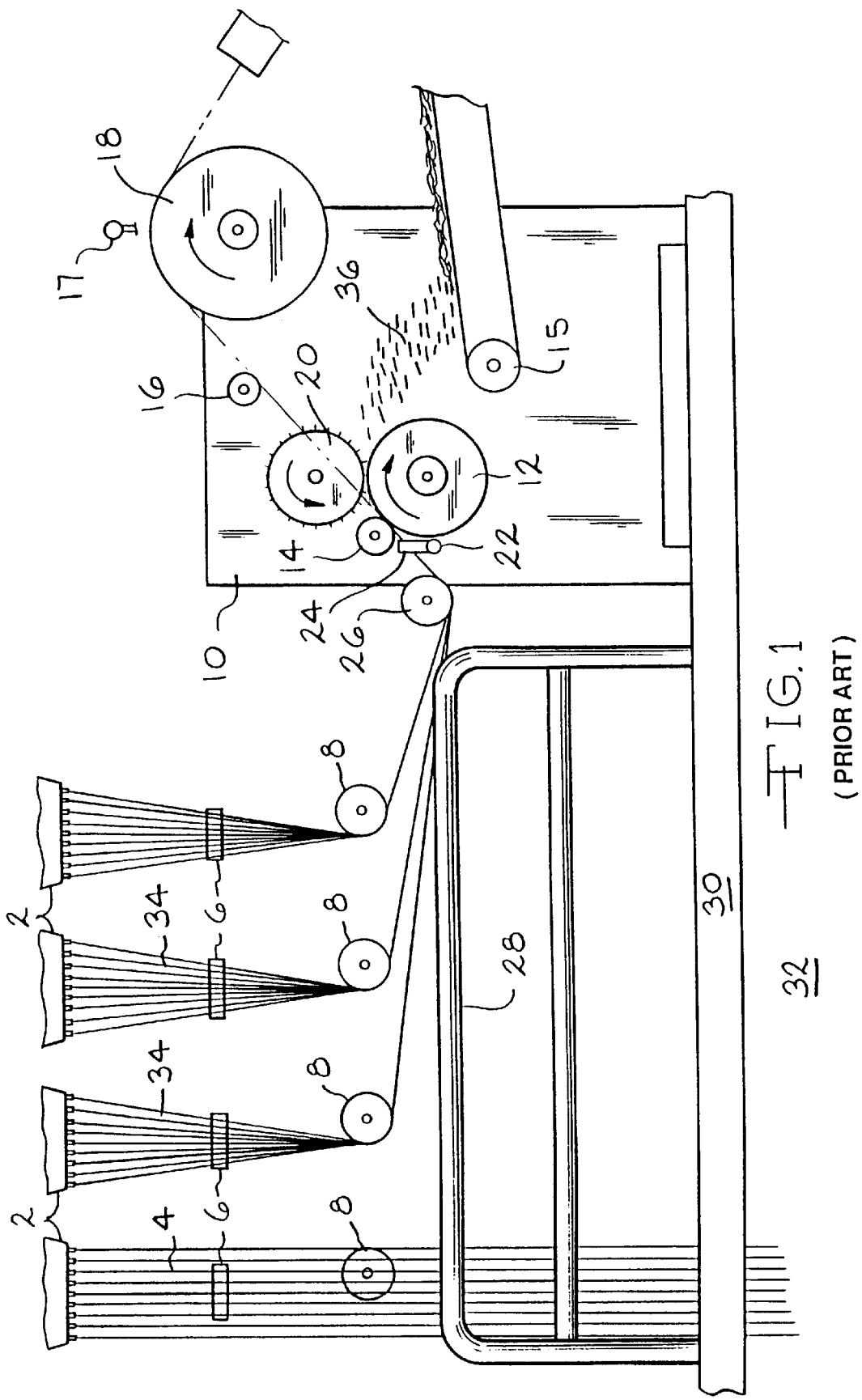
FIG. 1 is a vertical front view of a typical prior art process for making chopped fiber from a plurality of continuous strands.

FIG. 1 shows a pertinent portion of a typical prior art system for making chopped fibers, such as glass fibers. Molten glass is fed from a furnace and forehearth (not shown) into a plurality of electrically heated fiberizing bushings 2, each having a bottom plate with holes and or hollow tips therein through which the molten glass is extruded to form a multitude of coarse, primary fibers 4 which fall downwardly as the glass is extruded through the tips forming an array of primary fibers. Below each bushing and slightly beyond the array of fibers is an applicator roll 6 for applying chemical sizing to the fibers once a strand of fibers has been started. Below each applicator roll and beyond the array of primary fibers is a turning or pad wheel 8 which is used to guide a strand of fibers in a generally horizontal direction towards a chopper 10.

The chopper 10 comprises a frame (not shown) on which is mounted a backup roll 12 having an outer surface typically of polyurethane which is somewhat soft, a pulling roll 14 which cooperates with the backup roll or cot 12 to pull strands of fiber into the engaging nip between a blade roll 20 and the backup roll 12. Blades spaced apart in the blade roll 20 cut the fiber strands into bundles of desired lengths and project them onto a moving conveyor belt 15 which removes the chopped fiber from the area and transports it to a packaging station.

The chopper is also equipped with a guide roll 16 located above and near blade roll 20 and near and below a starting roll 18. The latter, and the pulling roll 14, are driven at a desired speed such that the surface speed of these two rolls equals the desired pulling speed of the fiber strands to produce the fibers having a desired diameter when the [flow rate of the] fiberizing bushings are controlled to a near constant flow rate per tip. The chopper 10 also has a strand transitioning device located below and to the left of the pulling roll 14 comprising a shaft 22 with a finger 24 on its extreme end. The finger can be moved towards the chopper by retracting the shaft 22 along its axis parallel to the axial center line of the pulling roll 14 and the backup roll 12 by a fluid cylinder (not shown) and returned to its starting position for the purpose of engaging a running strand and pulling it into the nip between the pulling roll 14 and the backup roll 12.

A guard rail 28 prevents the operators tending the bushings from stepping into holes in the floor 30, usually one large hole below each bushing for the array of primary fibers to run through into the scrap basement 32.

The chopper can also optionally be equipped with a fiber strand separation roll 26 for holding each fiber strand separate from the other strands and guiding the plurality of strands into the nip of the pulling roll 14 and the backup roll 12 in a desired spaced apart relationship. This separation roll 26 is shown in plan view in FIG. 2 and comprises a roll 26 having smooth, rounded valleys 27 on its surface, formed by smooth, rounded ridges 29 therebetween, for the strands to run in. The roller can be rigidly mounted on a shaft that is mounted on two or more bearings and very slowly rotated by a small gear drive to prevent the strands from wearing flat spots where they slide over the surface of valleys 27.

Referring back to FIG. 1, the three bushings 2 on the right of the figure are running fiber strands into the chopper making chopped fiber while the bushing on the extreme left has broken out, beaded down and is running an array of coarse, primary fibers 4 into the basement 32 (a bushing running in this mode is described as "hanging"). To start this "hanging" bushing into the chopper, the operator will stand facing the array of primary fibers, he will gather the array together into a strand with both hands while letting the array slide through his hands. Once he has a tight strand, the operator will grab the strand in one hand while pulling it down in such a way that the array of primary fibers are pulled against a sizing applicator roll and the strand is pulled down and around the pad wheel 8 and, after breaking the strand to get a new end, will start walking to the chopper 10 while gripping the strand near the new end. As he nears the chopper, and while continuing to pull the strand, he guides the strand under the guide roll 26, over the strand transition shaft 22 inside the finger 24, over the backup roll 12 (without touching the strand to the backup roll), under the guide roll 16 and over the starting wheel 18, pulling the strand onto the surface of the top portion of the wheel 18 while still pulling the strand and engaging a switch 17 that starts wheel 18 spinning after which it is accelerated up to the desired surface speed. As soon as the strand makes contact with the surface of the top portion of the wheel 18, this wheel will take over pulling the strand, so the operator releases the strand just above the top surface of the wheel, or sometimes as soon as the strand contacts the wheel. The strand is projected by the wheel 18 into a chute which directs the strand to the scrap basement or a hopper. After a few seconds the fiber strand will be up to full running speed at which time shaft 22 is automatically retracted moving finger 24 towards the chopper frame engaging the running strand and pulling it into the nip between the backup roll 12 and the pulling roll 14. At that time the pulling roll 14 takes over from starting roll 18, the strand is cut by cutter roll 20, and the remainder of the starting strand is thrown into the basement by roll 18. Shaft 22 is then automatically extended back to its starting position, roll 18 is shut down and the system is ready to start the next strand while the running bushings continue to be chopped. The purpose of this start up procedure is to get the fiber strand up to proper pulling speed, thus proper fiber diameter, before the strand is fed to the cutter roll 20.

Normally, there are at least ten bushings on at least thirty two inch centers in a row of bushings with the closest bushing being about six horizontal feet from the chopper. This means, on average, an operator must walk at least about 40 feet to start each bushing and return to the center of the row of bushings. Operators walk at an average speed of about 3–4 feet per second when starting a strand. Sometimes there are 14 or more bushings in a row for each chopper. An operator may have at least six breaks an hour per bushing during and following a glass upset which happens when raw materials become contaminated, when the equipment malfunctions and when power outages occur. Break rates of 1–2 breaks per hour can occur frequently in normal operations. This means that an operator might need to start more than 480 bushings per line and might need to walk at least about 19,000 feet per eight hour shift, over 28,000 feet per twelve hour shift, just to take new fiber strands to pullers, etc. While he is walking towards the chopper, guiding the strand onto the starting wheel, and returning to the next bushing needing starting he cannot be [starting another bushing] doing anything else. Because of the workload on the operator with this system, bushings often hang longer than necessary waiting on the operator to get there. Also, until an operator has many hours of training, they frequently incorrectly pull or guide the strand causing the bushing to break out while trying to start the strand into the chopper. When this happens it takes typically 1–5 minutes for the bushing to bead down and to be ready to restart.

The operator also has other important duties besides starting bushings, such as making sure the sizing applicators are clean and getting the proper flow of sizing solution, that the bushings are functioning properly, that the chopper is cutting properly, that everything is kept clean, etc. If the operator did not have to do so much walking, and preferably did not have to form the primary fibers into a strand, he could increase fiberizing efficiency, the percentage of time that each bushing is making good product, while taking care of more bushings and making a more consistent product, all of which would reduce manufacturing costs.

Figure 2:
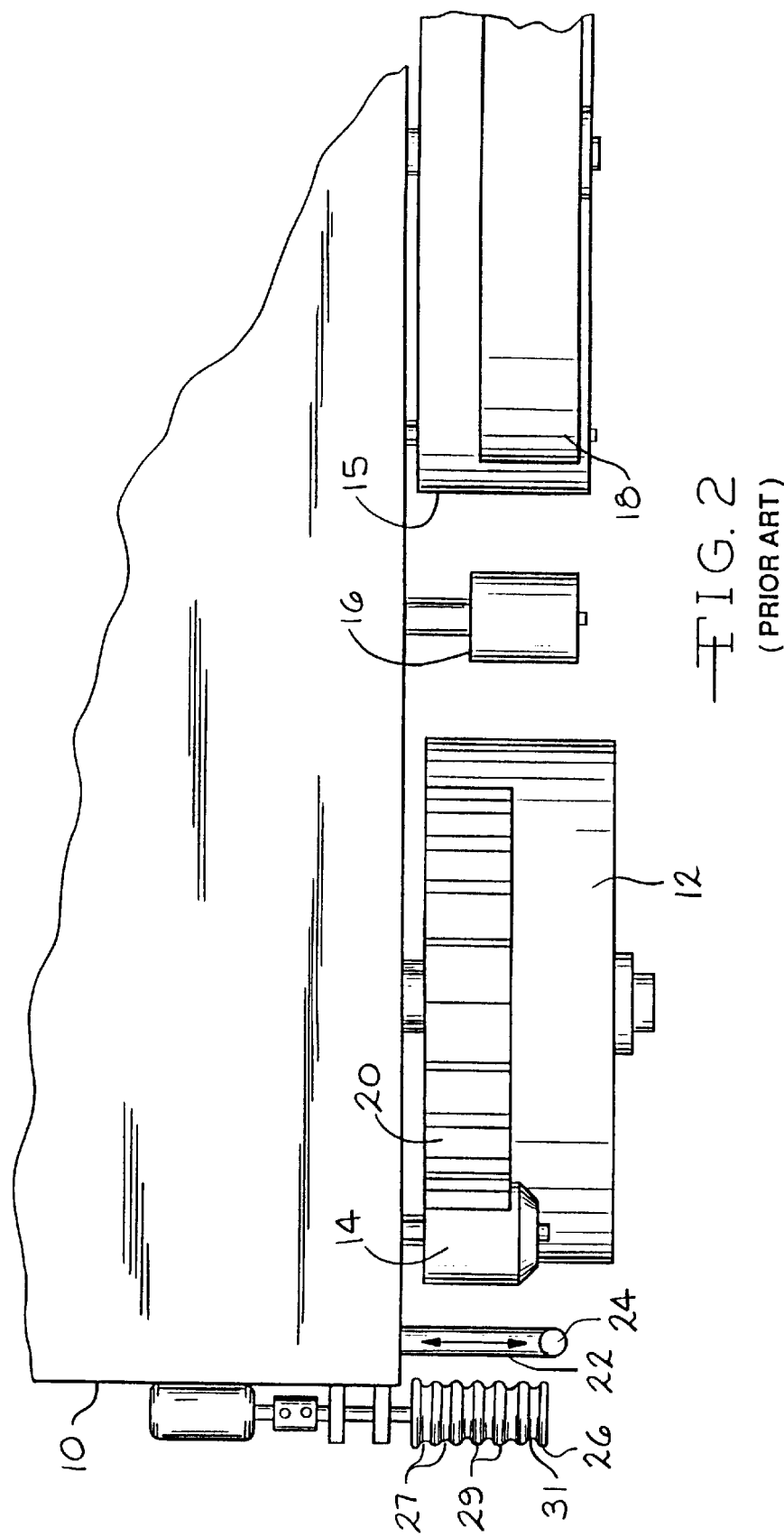
FIG. 2 is a plan view of a prior art strand separation means or roll and a portion of a chopper and conveyor like that shown in FIG. 1.
Figure 3:
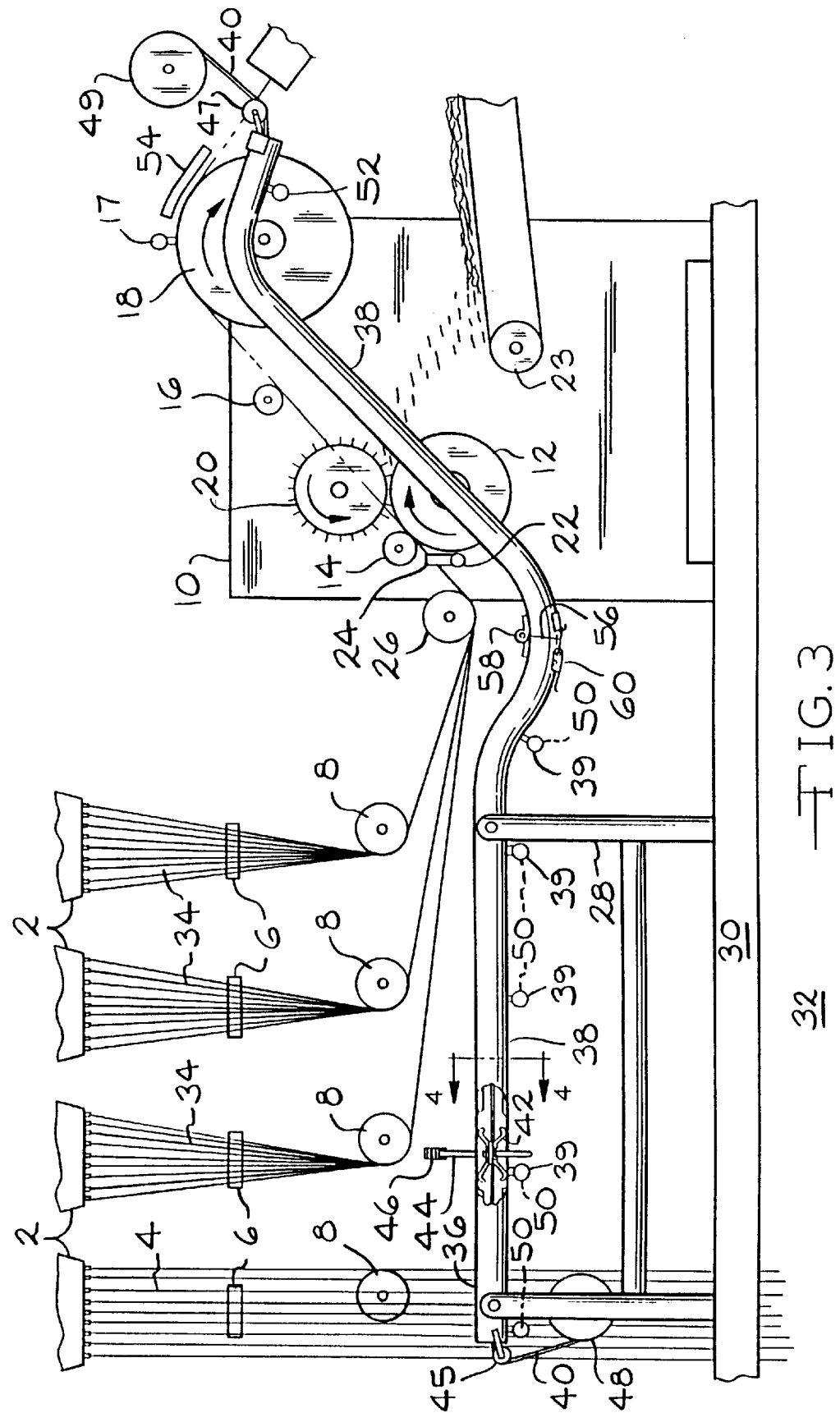
FIG. 3 is a vertical view of an apparatus of the present invention for automating the step of pulling a fiber strand to a chopper and putting the strand into a pulling mechanism.

The disadvantages of the current practice are overcome and these long desired results are achieved with the present invention. Referring to FIG. 3 the same fiberizing process is shown, but with the addition of apparatus to relieve the operator of so much walking, thus improving productivity. The process and apparatus shown is the same as shown in FIGS. 1 and 2, except for the addition of an automatic strand starting system 36 of the present invention. The system 36 is comprised of a guide rail 38, a flexible member 40, a carriage assembly 42 attached to the flexible member 40 and adapted to run back and forth inside or on guide rail 38, carriage initiation switches 39, an arm 44 attached on one end to the assembly 42 and having on its other end a gripping mechanism 46, preferably biased in the closed or gripping position, driven take-up assemblies 48 and 49, each with an adjustable drag brake, in fairly close proximity to each end of the rail 38 for pulling and winding up the flexible member 40 in one instance and for unwinding and paying out the flexible member 40 in the other instance, proximity or position sensors 50 and 52 spaced along said rail 38, and a cam 54 located above said starting wheel for engaging said gripping mechanism 46 to bias said mechanism to a releasing position.

The guide rail 38 is parallel to and spaced from the desired path of the fiber strand once the strand is pulled around the pad wheel 8 and is taken towards the chopper 10, taken under the optional strand separator roll 26, over and above the backup roll 12, under the guide roll 16 and over and onto the starting wheel 18. To make it easier to service the chopper 10, it is preferred to split the guide rail 38 between the closest bushing position to the chopper and the chopper itself as shown at 56. By providing a quick disconnect in this vicinity, such as a hinge 58 and a clamp 60, the portion of the rail 38 in front of the chopper can be quickly pivoted upward to get it out of the way of working on the front of the chopper.

Figures 4, 5:
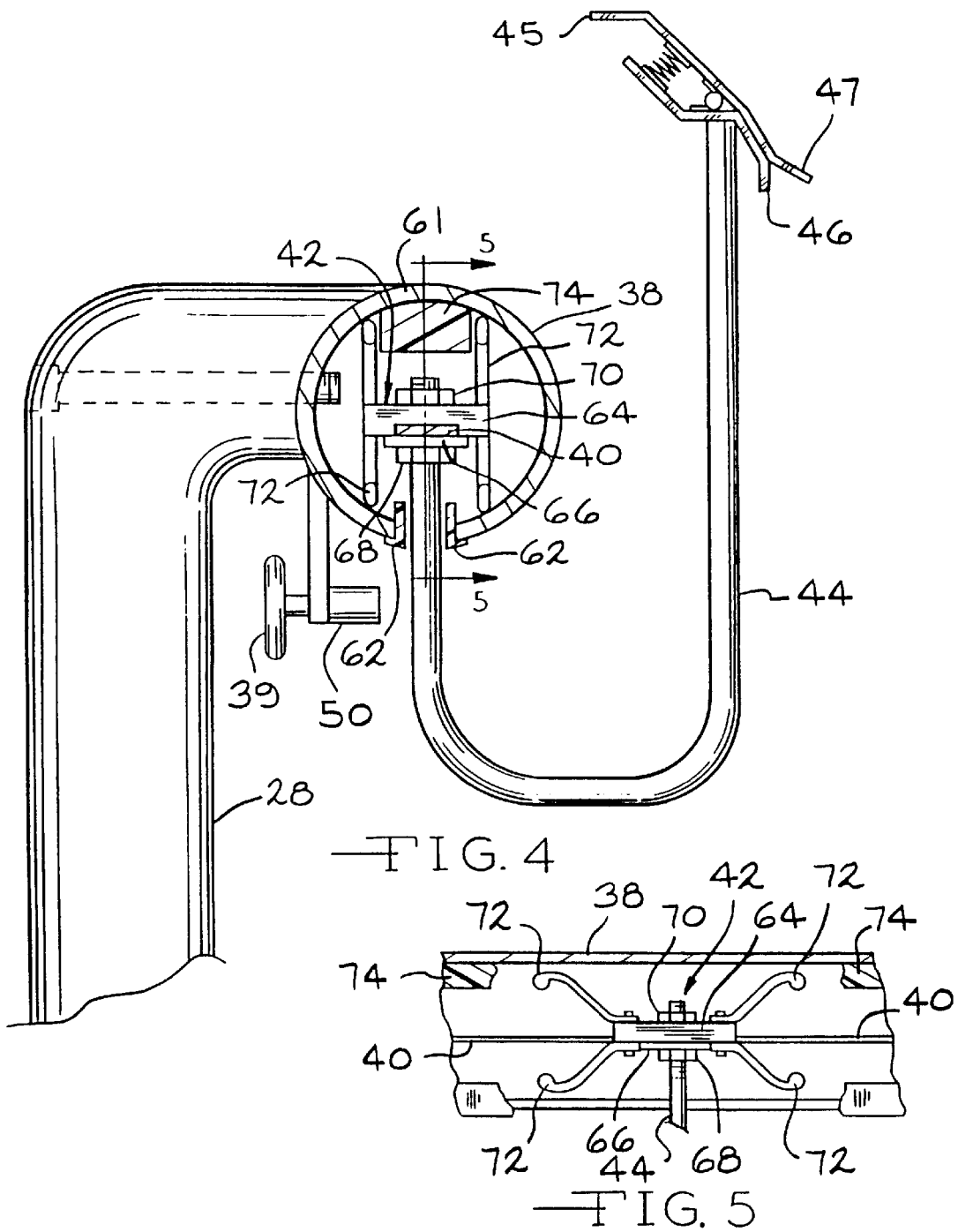
FIG. 4 is a cross sectional view of a portion of an embodiment of the apparatus shown in FIG. 3.
FIG. 5 is a partial cross section of FIG. 4 taken along lines 5—5 with some parts cut away to enable a clear side view of a carriage assembly.

Fiber forming rooms have a very harsh environment of water spray, sizing chemicals dripping or misting, fibers and glass beads falling and hanging up on all projections, heat and physical abuse when changing bushings. Therefore, for reliability, safety and to enhance housekeeping, the materials used and the design of any equipment for the forming room must address these needs to be most successful. The rail 38 can have many cross sectional configurations as a skilled designer can readily see, but preferably, the rail 38 is made from a tubular material such as a pipe and can be made to serve as the top rail of guard rail 28 as shown in FIG. 4. By using a tubular member such as a pipe 61, an oval, a box channel or beam, the carriage assembly 42 can be made to travel inside this rail 38 where it is protected from the harsh environment and does not create a housekeeping and safety problems. While this is very desirable, an open guard rail will work, but will be harder to keep clean and running properly and to meet safety requirements.

The pipe rail 38 is preferably made from stainless steel, heavy reinforced thermoset plastic or aluminum, etc. The pipe rail is slotted, preferably on the underneath side, to allow the arm 44 to pass through the wall of the pipe. Optionally, teflon or high density polyethylene guide strips 62 are attached to the outside of the pipe adjacent each side of the slot and extend up through the slot at least to the inside of the pipe 38. These guide strips 62 prevent arm 44 from wearing on the edges of the slot, but are not essential to the invention. The arm 44 should be fairly rigid, but as light weight as practical. It can be made from reinforced plastic or it can be stainless steel tubing or pipe. One end of arm 44 is threaded and the other end is attached to a clamp or gripper 46, preferably a spring clamp biased in the gripping position. The gripping surfaces of the clamp are preferably covered with an elastomeric material or heavy duty foam rubber [or urethane] or a plastic material, like Tygon® or polyurethane. The ends 47 of the gripper portion of the clamp are preferably flared out to permit the operator to pull the fiber strand into the gripping portion without having to open the clamp 46 by pressing down on a release handle 45.

The carriage assembly 42 comprises a frame member 64, having a hole in its center to allow a threaded end of arm 44 to pass through and be rigidly attached to the frame member 64. The bottom of the frame member 64 is slotted to hold the flexible member 40, which preferably is a timing belt. The threaded end of arm 44 passes through a hole in the [timing belt] 40 and the belt is held tightly in the slot in the frame 64 by a retainer plate 66 and nuts 68 and 70 tightened against the top of the frame member 64 and the bottom of the retainer plate 66 respectively. Four flexible, sliding supports 72 are attached to the frame member as shown in FIG. 5. The sliding supports 72 need to be flexible to allow the carriage 42 to pass through curved portions of the pipe rail 38 and need to be of a material that creates low friction with the material of pipe rail 38. Spring steel can be used as can nylon, reinforced nylon and other plastic materials, with or without reinforcement. Preferably the cross section of the sliding supports 72 is round or oval to minimize friction and wear. A support member 74 located on the interior of the pipe rail 38 opposite the slot in the pipe rail is not essential, but does help to align the carriage properly as it moves through the interior of the pipe rail and also serves to support the belt 40 in [at least one of the curves in pipe rail 38. The support member 74 can be attached with adhesive or screws entering through holes in the top of pipe rail 38 and can be made of any material having low friction with the material of sliding supports 72.

Figure 6:
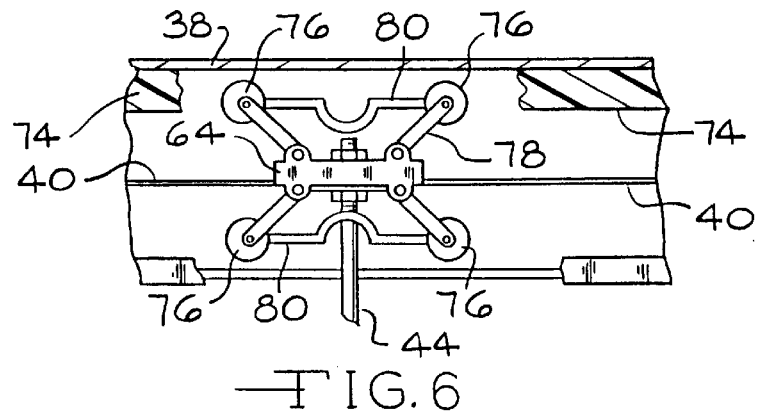
FIG. 6 is a similar view as FIG. 5, but of another embodiment of a carriage assembly.

Instead of being supported by the sliding supports 72, the frame member 64 can be carried with wheels such as is shown in FIG. 6. In this embodiment four wheels 76 are supported on each side of frame member 64, each by an axle rotatably attached to a pivoting link 78 and one end of a spring member 80. The other end of each link 78 is pivotly attached to a side of frame 64. The other end of each spring 80 is rotatably attached to the axle of the opposite wheel 76 on the same side of the frame 64. The springs 80 bias the wheels 76 outwardly against the inner surface of pipe rail 38 with sufficient force to support arm 44 reliably while allowing the carriage assembly to negotiate curves in the pipe rail 38. While coil springs can be used, a wishbone of spring steel wire or rod is shown in FIG. 6.

The control system for the automatic strand starting system of the present invention is fairly simple. When an operator is ready to start a bushing he moves to the proper position and either presses a position button optionally located below each bushing (not shown) or preferably passes a piece of metal near the proximity sensor 50 for the bushing he wants to start. When either of these occur, the drive for take up 48, or 49 depending on where carriage 42 is located at that time, will start and move carriage 42 until arm 44 is sensed by the proximity sensor 50 for that bushing, at which time takeups 48 and 49 will stop, leaving carriage 42 and gripper 46 in the proper position for starting the bushing. The operator gathers the array of primary fibers forming a strand, cuts or breaks the strand to form a new end, pulls the strand into and under a V-shaped pad wheel 8 and between flared gripper ends 47 and into the gripper 46 while at the same time activating a carriage initiation switch 39 (see FIG. 4). This latter move will start the drive on take up 49 moving the carriage assembly 42, arm 44, and the [clamp] gripper 46 with the fiber strand gripped therein down the length of pipe rail 38.

As the arm 44 nears proximity sensor 52, the top surface of the release handle 45 of the gripper 46 comes in contact with a cam 54 located adjacent and above the starting wheel 18. As the arm 44 continues to move towards proximity switch 52 the clamp handle surface 49 is pressed hard enough against the surface of cam 54 that the clamp is opened allowing the fiber strand to fall out and down onto the starting wheel 18. Actually, when properly adjusted, the strand will contact the starting wheel just slightly before the strand is released from the spring clamp 46. After the strand is released the arm 44 is very near the sensor 52. When sensor 52 senses arm 44 it stops the drive on take up 49 and either leaves the arm 44 there, if the operator has not already called for it at another bushing position, or preferably starts the drive on the take up 48 to return the arm to a "home" position which can be anywhere along the pipe rail path, but preferably is some distance beyond the bushing farthest from the chopper. Another proximity switch is located at that position to sense arm 44, only after just previously having been sensed by sensor 52, to stop the drive on the take up 48. The take ups 48 and 49 each have an adjustable brake to put a slight amount of tension on the belt 40 while the belt is being unwound off of the take up by the other take up.

Another advantage of the apparatus of this invention over the manual prior art process, in addition to the advantages already discussed above, is that the carriage assembly 42 and arm 44 can pull the strand to the chopper a lot faster and safer than a walking operator, thus further increasing the percentage of time that each bushing is making good chopped fiber product. For example, whereas operators pull strands at an average speed of about 3–4 feet per second [when walking] to the chopper, the above apparatus can pull the strand [at] at least twice this speed, or at least 6, 7 or 8 feet per second. Also, it can be seen that by using the proper drive for the take up 49, the strand can be accelerated on the way to the puller 18 to a speed of 18 feet per second or faster.

Another big advantage of this invention is that now the strand processing apparatus can practically be located much further away from the fiber forming bushings and even outside the fiber forming room where more space is available for larger equipment and where the operating environment for strand processing equipment is much improved. This has not been practical in the past because of the distance an operator would have to walk.

Figure 7:
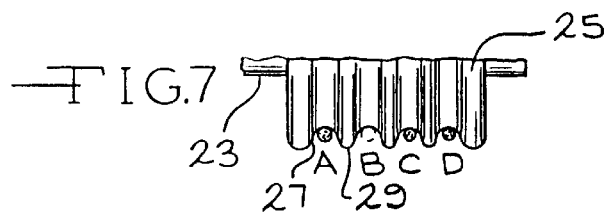
FIG. 7 is a partial view of a strand separator roll as it appears when one fiber strand is not running where it normally runs.

After the finger 24 has pulled the new strand into the nip between the puller 14 and the chopper roll 20, an optional further embodiment of the present invention positions the new strand into the proper valley 27 of the strand separator roll 26 (see FIG. 2). Referring to FIG. 7, which is a partial view of a strand separator roll 25, preferably different in design than the separator roll 26 shown in FIG. 2, by not having the valley 31 used for the start up strand. The roll 25 is fixed and supported on a slowly rotating shaft 23. The valleys 27 are labeled A through D, for a line containing only four bushings. Strands are running in valleys A, C, and D. The strand for B valley, after it is started, is then moved to B valley by hand to free valley 31 for the next strand start. According to the present invention, when the optional strand separator roll is used, this step is done mechanically and automatically with a novel strand positioning apparatus.

Figure 8:
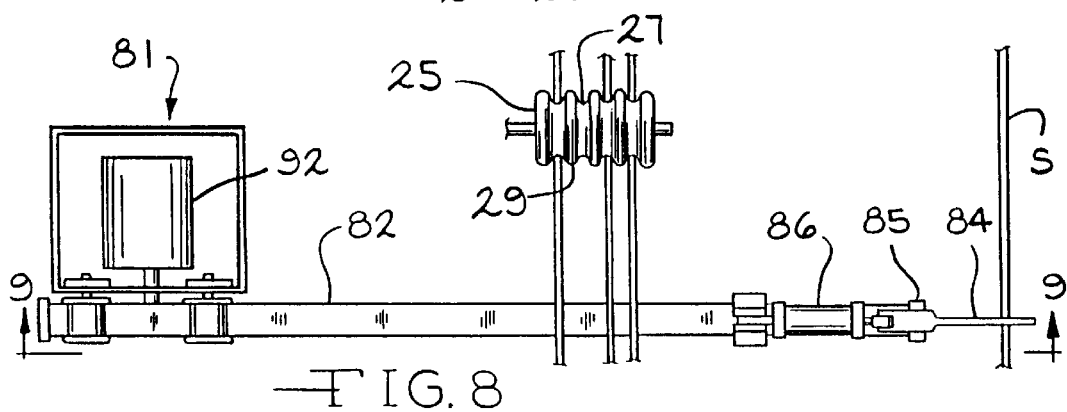
FIG. 8 is a partial plan view showing the strand separator roll and an optional embodiment of the present invention, an apparatus to automatically move the new strand to the appropriate place on the strand separator roll.
Figure 9:
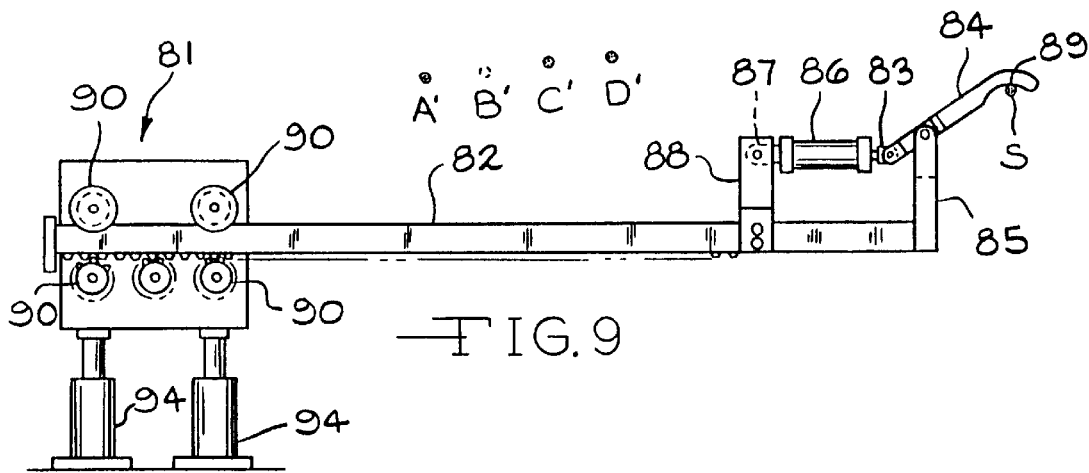
FIGS. 9 and 10 are vertical views of the apparatus shown in FIG. 8 showing a strand starting location and a strand releasing and positioning location respectively.
Figure 10:
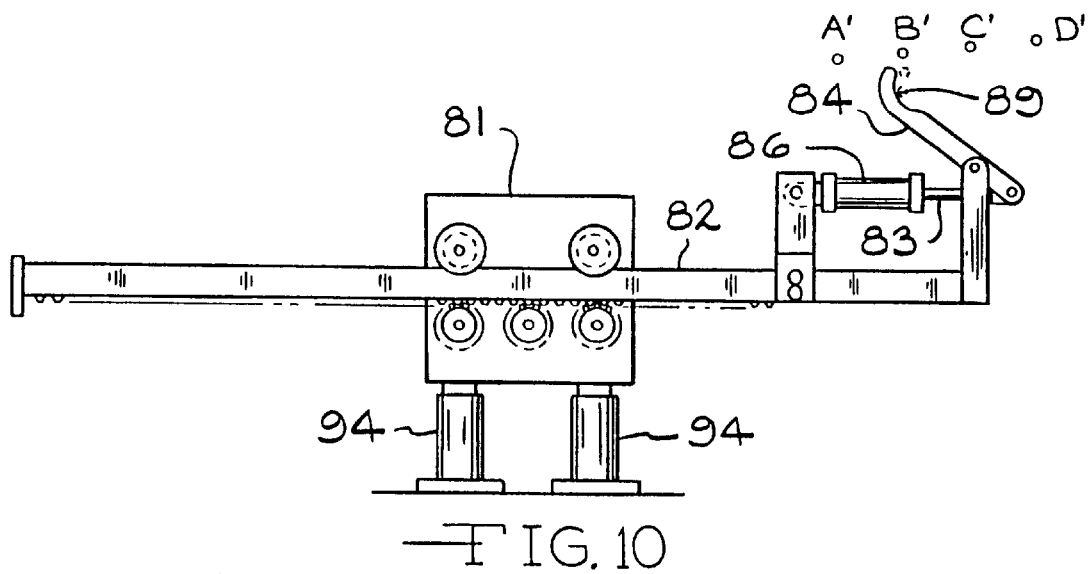

FIGS. 8–12 show strand positioning apparatus and operation for accepting a starting strand and for moving the strand to the appropriate valley on the strand separator roll. FIG. 8 is a plan view of a portion of the forming room between the strand separator roll 25 and the bushing position nearest the chopper. The strands are in the same positions as they are in FIG. 7. A strand positioner assembly 81 is located close to the chopper and separator roll 25, preferably lower than the separator roll, but this is not necessary. The strand positioner assembly 81 comprises a generally horizontal arm 82, preferably being a gear toothed rack with the teeth on the underneath side and having on one end a strand holder member 84 curved slightly at its extremity to form an eye 89 for receiving and holding a running strand. The member 84 is pivotly coupled at a point along its length to a fixed vertical member 85 and, at its opposite end to a rod 83 of an actuator 86. The actuator 86 can be an electrical solenoid, an air cylinder or other actuating device and is attached to a clevis mount 87 which in turn is pivotly attached with a pin to a second vertical member 88, rigidly attached to arm 82. Assembly 81 further comprises a geared stepping motor 92 cooperating with the teeth in arm 82 to move strand holder 84 back and forth in a horizontal direction, a plurality of rack guide rolls 90, optionally one or more vertical positioners 94 (see FIG. 9), and a control system with memory (not shown). As shown in FIG. 9, the strands A', C', D', with B' shown in phantom for where it will be placed, are spaced apart, on an incline or are at this location, above the path of eye 89, as shown in FIG. 8.

The control system can cause the strand holder eye 89 to be moved perpendicular to and beneath the running strands and knows where the strand holding eye 89 of member 84 is at all times using an X axis sensing and control system. The control system also knows where the positions A'–D' are on the X axis, and optionally can be designed to also know where these positions are vertically, or on a Y axis. Optionally, beneath the [horizontal] positioner 81 is one or more vertical positioners 94 that operate with a Y axis sensor and control system and the control system has programmed into its memory where the eye 89 should be vertically to receive a new a strand and to later release this strand.

When the operator calls for arm 44 to come to the bushing he will be starting a strand from, this signal also goes into the memory of the control system for positioner 81 indicating the number of the valley to position the next strand in on the separator roll 25, and actuates stepper motor 92 and actuator 86 to place eye 89 into the position shown in FIGS. 8 and 9.

After the automatic strand starter shown in FIGS. 3–6 has placed a new strand in eye 89 and started the strand onto the puller roll 18, and when a signal is sent to move finger 24 back into its normal position, a signal is also sent to the positioner 81 to move eye 89 and the new strand to the proper position for releasing the new strand into valley B, or the proper valley for the strand as stored in the control system memory. Once eye 89 is in this location, the control system stops stepper motor 92 and signals the activator 86 extending rod 83 which pivots eye 89 to the position shown in FIG. 10, allowing the strand S to release from eye 89 and slide up into position B' and into valley B of the separator roll 25. The strand is shown in phantom positions to show the path it moves in as it slides into position B' (B prime).

While this automatic strand positioning apparatus has been shown with the automatic strand starter system shown in FIGS. 3–6, this novel apparatus can also be used to improve the manual prior art process shown in FIGS. 1 and 2. Manually moving the strands into position on separator roll 26 is a safety hazard because occasionally a hot bead or sliver gets caught in a strand and can hit an operator's hand at up to sixty miles per hour or faster causing burns and/or a sliver to be driven into a finger and even finger bone.

Although the vertical positioner 94 is not necessary, it can be used to enhance the performance of the strand positioner apparatus, particularly where many bushings strands are present in each fiberizing line. The vertical distance between the first and last strand in the plane of the movement of eye 89 will be much greater when many strands are present. It will be readily seen that several other known devices can be used to modify this apparatus to reposition a newly started strand in the manner disclosed here and it is within the ordinary skill of the art to do so. For example, vertical member 85 could be eliminated by pivoting member 84 on the end portion of arm 82 using a hinge 95.

Figure 11:
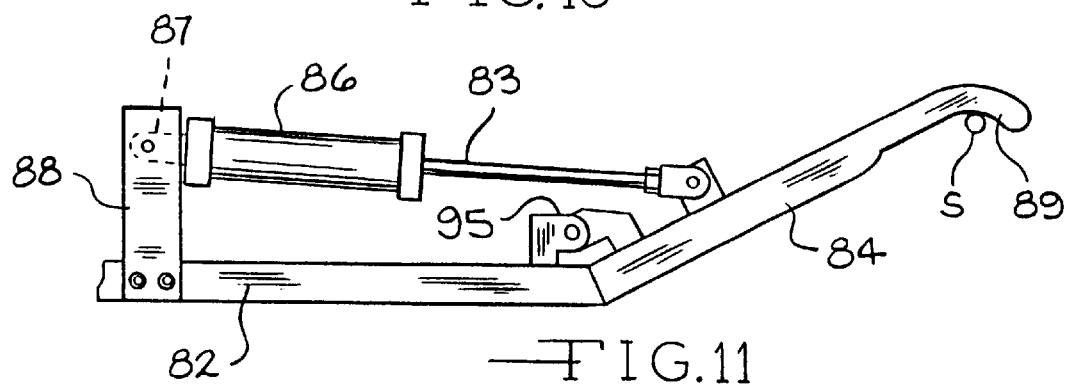
FIGS. 11 and 12 show another embodiment of a portion of the apparatus shown in FIGS. 9 and 10.
Figure 12:
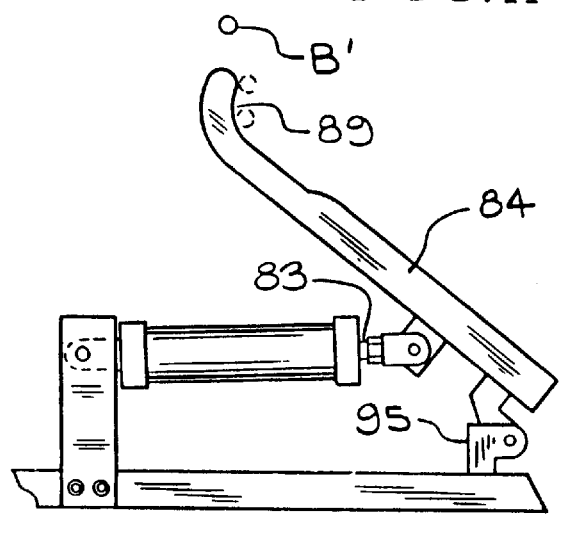

As shown in FIGS. 11 and 12. In another modification a strand separator roll similar to the roll 26 shown in FIG. 2, but modified as shown in FIG. 13 by having an enlarged diameter valley 31 for starting the strand in, instead of starting the strand in eye 89, could be used. In this case the control system for the positioning apparatus 81 would use a combination of horizontal and vertical movements of eye 89 to remove the new strand S from valley 31, before moving the strand to its proper location for release. It is also within the ordinary skill of the control systems designer to design a control system to operate in the manner described above without using any inventive skill.

The remaining optional portion of the invention deals with automation of the strand forming process to reduce operator workload still further and to get strands started faster into a chopper or other device, or preferably to cooperate with one or more of the devices previously disclosed in FIGS. 3–13 to fully automate fiber and strand starting. When a bushing breaks out entirely, i.e. when it is no longer running into the puller or chopper, molten glass extruding from the tips first forms beads of molten or hot glass on the end of the tips. When each bead reaches a certain size, it breaks loose and falls pulling a coarse primary fiber behind it. Every tip must bead down before restarting a complete strand from the bushing into the chopper. If the strand is not complete, i. e. containing a primary fiber from every running tip on the bushing, the bushing will break out again very quickly. When a bushing is new and properly adjusted, the glass flow is very uniform through all of the tips and the bead down time can be less than a minute on a bushing designed for sixteen micron fiber. Bushings designed for making finer fibers require longer time to bead down under perfect circumstances. However, with time, the tip plate sags, cooling tubes that cool the tips and fibers become misaligned and other changes cooperate to cause variation in the flow rate of molten glass through at least a few of the tips, resulting in full bead down times of as much as twelve minutes or more.

Such long bead down times substantially reduce the percentage of time a bushing is making product, and increases scrap. To reduce the bead down time beyond what can be done by good bushing maintenance procedure, the operator, once most of the tips have beaded down which usually is within two to five minutes following the breakout, will force the remaining tips to bead down by gathering the array of primary fibers together and moving the strand, first to one side far enough that running primary fibers will attach to a bead on an adjacent tip on that side, and then to the opposite side to pull down those beads and to attach fibers to the remaining beads. The operator may have to repeat this cycle if beads remain on the bushing. Then after letting the bushing hang for a few seconds, to get all tips in the array, he gathers the array once again to form a strand, breaks the strand to form a new end and starts the strand into the chopper. Since it is more work and uncomfortable to force a bushing to bead down faster, this is not always done, particularly when the operator is very busy or is fatigued. It is thus desirable to also automate this portion of the process.

Figure 15:
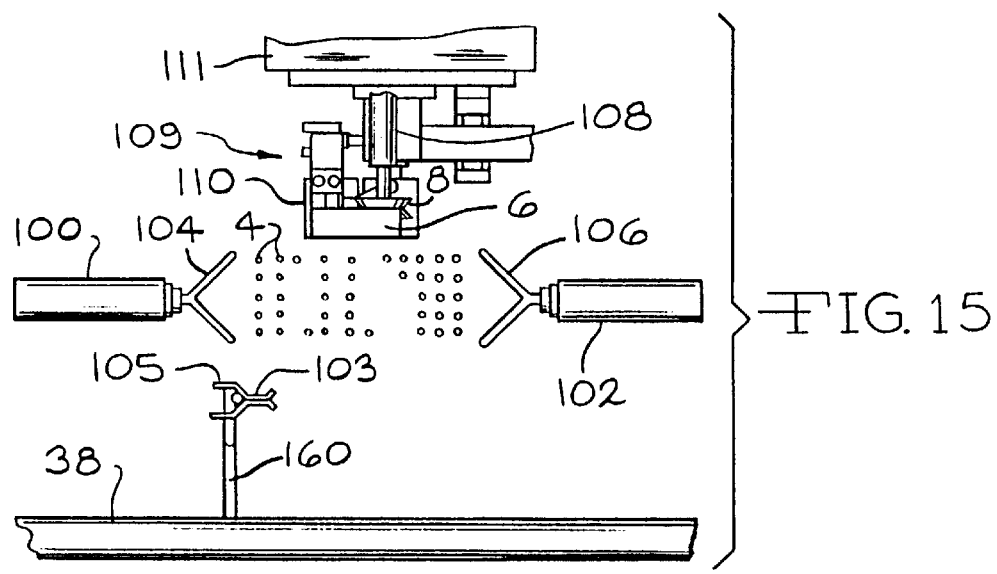
FIG. 15 is a partial cross sectional plan view of FIG. 14 taken below a fiberizing bushing.

FIG. 14 shows apparatus of the present invention installed in the same fiber making process shown in FIG. 3. In FIG. 14 the fiberizer 2 on the left side has broken out and partially beaded down, but some fiberizing or bushing tips still have beads 5 hanging on their ends. Fluid, air or hydraulic, cylinders 100 and 102 are mounted below and on each side of this fiberizer generally in line with the centerline of the fiberizers, as shown in FIG. 15 which is a partial cross sectional plan view of FIG. 14 taken generally beneath the bushing 2 looking down.

Each bushing in the line would be equipped with a similar arrangement of two cylinders by nesting them as shown with cylinders 102 and 200. The cylinders are telescoping, preferably with the rod of the cylinder having at least three sections to minimize the length of the cylinder needed. Attached to the rod of each cylinder is a gathering, V-shaped, wand 104, 106 with the V being in the horizontal plane and the base of the V attached to the cylinder rod in a rigid, fixed way. The wands 104 and 106 are identical and are made of a lightweight material, such as lightweight stainless steel tubing, that can tolerate the heat of the fiberizers and beads and the wet, corrosive conditions normally present in the fiber forming area.

Sizing applicator roll 6 remains unchanged as does the shape of the pad wheel 8. However, in the system shown in FIG. 15, the pad wheel 8 is mounted to a movable member, such as a rod of a fluid driven cylinder 108, that can move the pad wheel along an extension of its horizontal axis from its normal position of being behind the path of the array of hanging primary fibers to a position on the opposite side of said path (see FIG. 24).

The same pipe rail 38 and carriage mechanism (not shown in FIG. 14), but as shown in earlier figures, is used in this system, but the arm 44 is modified slightly to form a new arm 160 to mount a gripper 103 in a different orientation, i. e. the flanges of the gripper are oriented to receive a fiber strand when the strand is in a generally vertical orientation. The contacting flat surface of the cam 54 (see FIG. 3) for deactivating the strand gripper 103 is in a generally vertical plane in this embodiment. The gripper 103 is located at a lower level than the axial projection of the bottom of pad wheel 8 and between the path of array of primary fibers 4 and the pipe guide rail 38 and within the range of the pad wheel as it is extended by cylinder 108.

Referring to FIGS. 14, 15, and 21–23, below the normal running position of pad wheel 8, rests a strand manipulator 109 comprising a driven pull roll 110 mounted to a vertical plate 112, and a free wheeling idler pull roll 114 mounted to a pivot arm 116 with an axial shaft 115 about which roller 114 freely rotates. The arm 116 is pivotly mounted to a pivot shaft 118 towards its opposite end, with the shaft 118 being attached to the vertical plate 112. At the opposite end of the arm 116 is attached a rod of a cylinder 120 with a clevis and a pin in a hole through the arm 116 near its end in a known manner. The cylinder 120 is pivotly mounted with a yoke mount 122 and a bracket 124 attached to the plate 112. The cylinder 120 and the cylinder rod, arm 116 and pivot shaft 118 cooperate to move idler roll 114 through a radial path to come in contact with the driven roller 110 to form strand pull rolls, and then reverses the action at the proper time to return idler roll 114 to its normal position shown in FIG. 14.

Also attached to arm 116 at the end holding the idler roll 114 is a strand consolidating wand 117. The strand consolidating wand 117 comprises an arm 119 for attaching to the pivot arm 116 and a V shaped section 121 that makes an approximately ninety degree angle with arm 119 such that the plane of the V is generally perpendicular to the array of hanging primary fibers 4 and the inside of the base of the V is closer to the vertical line of the array of fibers 4 than the surface of roller 114 when roll 114 approaches a pulling position. When roll 114 and wand 117 are moved in a radial path towards driven roller 110, a bundle of fibers captured in the wand 117 will contact the base of the wand before it contacts the surface of roller 114. This will consolidate the bundle of primaries into a tighter strand before the rollers 110 and 114 grab the bundle, which is desired (see FIG. 27).

Mounted to the top of arm 119 is a blade holder 123 in which is mounted a removable blade 125 held in place in a slot in the top of the blade holder by one or more set screws. The blade 125 has a sharp edge facing the base of the V shaped section 121 and extends from the blade holder 123 towards the gripper 46 such that the blade 125 crosses a future path that the new strand will be pulled through. The purpose of the blade 125 and its location is to cut or break the strand at the desired time and location (see FIGS. 26 and 27).

Figure 23:
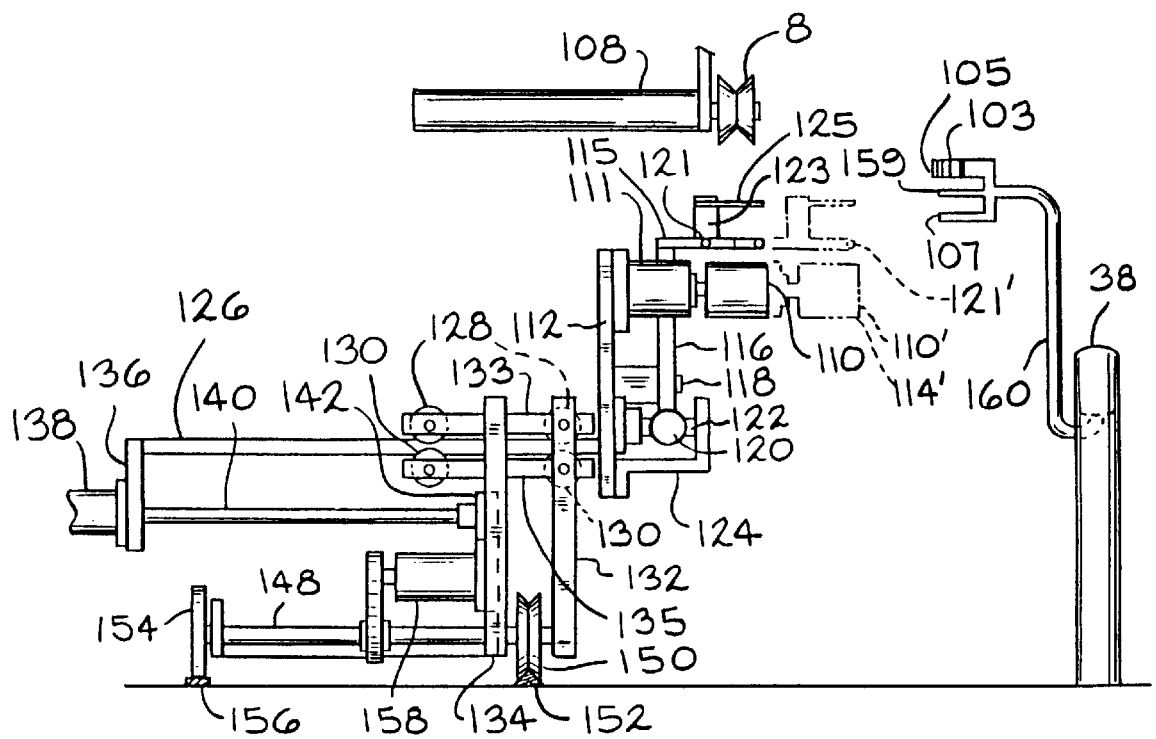

Referring to FIG. 23, there are mounted two strand breaker bars 159 and 107 below the gripper 103 projecting from the arm 160. The upper bar 159 has a square or rectangular cross section and the lower bar 107 can be the same or can have a round cross section as shown in FIG. 27. These bars will cooperate with a blade 125 that will be described later, but as shown in FIGS. 25–27, to break fiber strands in the strand starting process. The length of the bars 159 and 107 are long enough to overlap the strand breaking blade 125 enough to capture all of the strand at each fiberizing position, but short enough to avoid interference with a blade holder 123. The vertical plate 112 is rigidly attached to a horizontal movable plate 126 supported and guided by two rollers 128, spaced apart near each side edge of said horizontal plate and in contact with a top outer surface and two rollers 130, spaced apart near each side edge of said horizontal plate and in contact with a bottom outer surface. The rollers 128 and 130 are supported by bearing axles attached to vertical beams 132, being closest to vertical plate 112, and 134 being spaced several inches from beam 132. The vertical beams 132 and 134 are reinforced by a horizontal member 133 on each side of apparatus 109 spanning between each of the two beams above horizontal plate 126 and by other horizontal members 135 in a similar arrangement, but being attached below the level of horizontal plate 126.

Attached to the edge of plate 126 opposite the edge attached to vertical plate 112 is a second vertical plate 136, much smaller than plate 112, extending downwardly from plate 126 and having an opening in its vertical surfaces near its lower edge for receiving a fluid driven cylinder 138, the cylinder end of which is attached to the surface of plate 136 nearest to vertical plate 112. The end of the cylinder 138's rod, 140, is attached to a cross member 142 which in turn is attached to beams 134 near each side of horizontal plate 126. An axle 148 passes through bearings in beams 132 and 134 near their lower ends permitting grooved wheels 150 to be mounted between beams 132 and 134 and extending below to run on a stainless steel angle 152 attached to the floor of the fiber forming room. Near the other end of each axle 148 is mounted a narrow wheel 154 running on a flat strip 156 of stainless steel attached to the floor. One of the wheels 150 is driven by a reversible motor and gear drive 158.

Stainless steel angle 152 and a stainless steel strip 156 extend on the floor adjacent the line of bushings such that the strand manipulator 109 can be moved to any bushing position by activating the gear drive 158 in the proper direction. The angle strip 152 assures that the manipulator 109 will always be the proper distance from the array of hanging primary fibers when it stops beside a bushing position. Proximity sensors (not shown) are located in the proper positions to sense a member of manipulator 109 and to deactivate drive 158 to stop the manipulator in the proper position to start a strand from that bushing or fiberizer. The apparatus 109, take ups 48 and 49, cylinder 108, and cylinders 100 and 102 are all controlled with a control system (not shown) that also includes activating switches, proximity sensors and prior art bushing break-out detection sensors.

The apparatus shown in FIGS. 14–27 operates in the following manner to automatically start a strand from a fiberizing bushing. This apparatus cooperates with the apparatus shown in FIG. 3 and related figures to automatically start a strand and also to automatically feed the strand into a strand processing device like a chopper. When a break-out detection sensor (not shown) determines that a fiberizer has broken out, it sends a signal to the control system indicating the bushing position, by number, etc., which does several things. First, a timed program is started and immediately, if or as soon as the manipulator 109 is idle, drive 158 is activated in the proper direction to bring the strand manipulator 109 to the proper fiberizer—it will be stopped in the proper location by a proximity sensor located at that bushing position. At the same time take up 48 or 49 is activated to move carriage 42 towards the proper bushing position where it is automatically stopped by proximity sensor 50 in the correct location.

Figure 16:
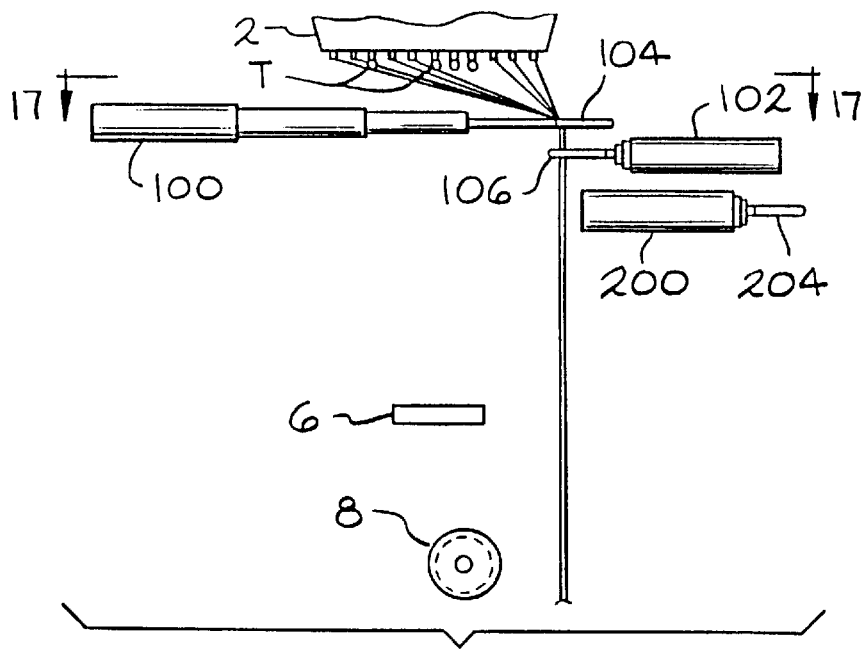
FIGS. 16–21 are vertical and partial cross sectional plan views showing the operation of the apparatus shown in FIG. 14.
Figure 17:
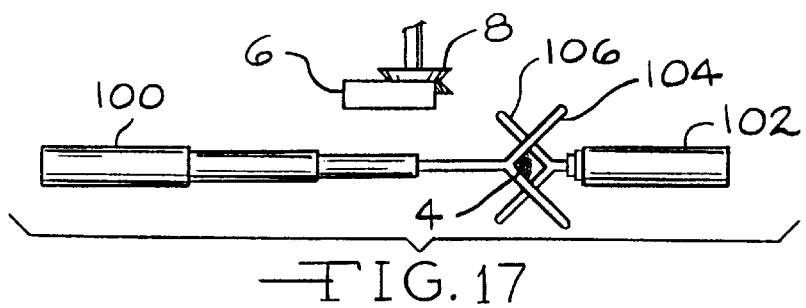
Figure 18:
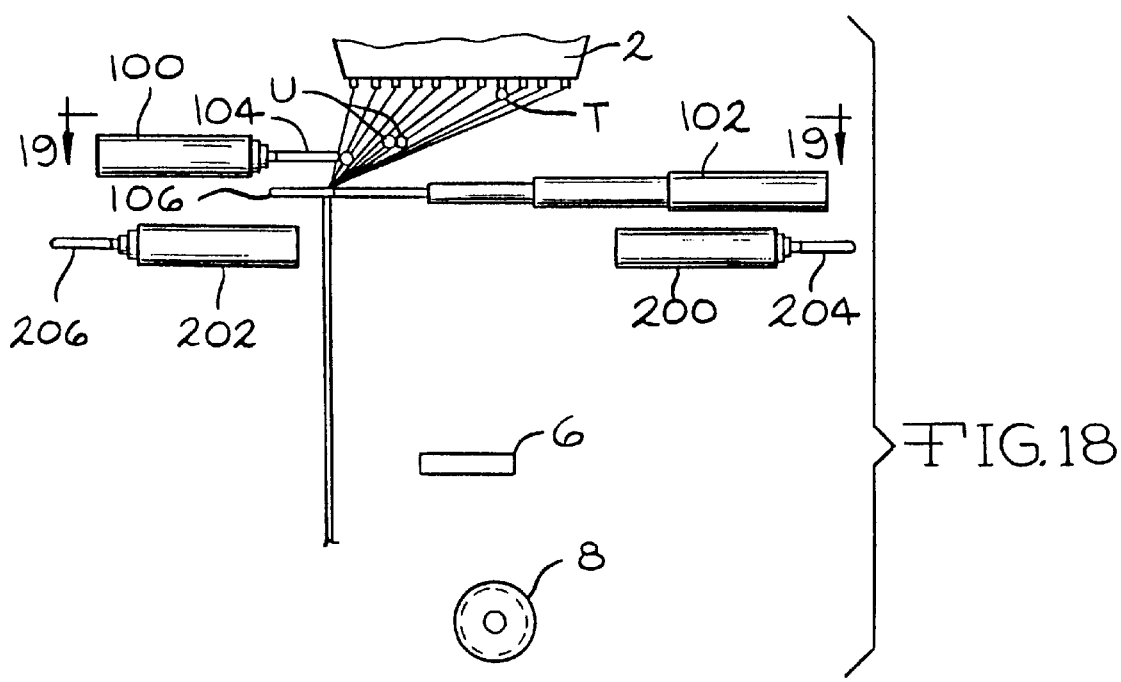
Figure 19:
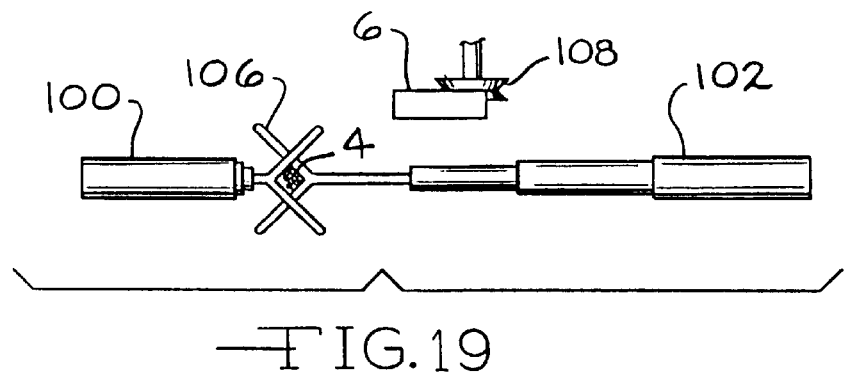

After a preset number of minutes, based on how long it takes for the bushings being used to bead down, cylinder 100 is activated to extend wand 104 gathering primary fibers 4 and moving the array to an extreme one side of the bushing 2 as shown in FIG. 16, This movement will bring one or more fibers in contact with one or more beads T where the fibers will stick to the molten beads. FIG. 17 shows in cross-section what the bundle of primary fibers 4 looks like cradled in base of the wand 104. Next, cylinder 100 is energized to retract wand 104 completely while at the same time cylinder 102 is energized to fully extend wand 106. This pushes the primary fiber array to the extreme opposite side of the bushing as shown in FIGS. 18 and 19. As can be seen in FIG. 18, as the array is moved from the right side of the bushing back to the left side, the fibers stuck to the beads U have pulled them off of the tips and those tips are now running primary fibers.

When there are initially two or more beads in a row, there will still be beads T left on their tips. As the array is moved to the extreme opposite end by extension of cylinder 102, a fiber will contact some or all of the beads T. Next, the cylinders are reversed to retract wand 106 and to extend wand 104. The beads stuck to a fiber will be pulled away from the tips. When three or more beads occur in a row it will be necessary to repeat this cycle, or at least one half of the cycle. Currently there is no known sensor other than the human eye to tell if one or more tips still has a bead. That problem is overcome by designing the program to repeat the above described cycle one half or more times, and preferably two or more times.

Figure 20:
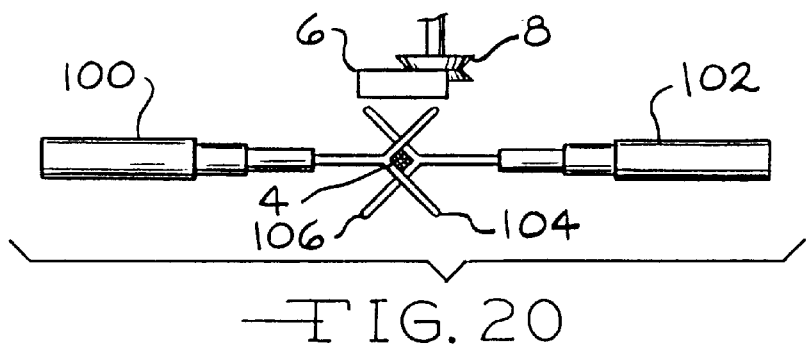
Figure 21:
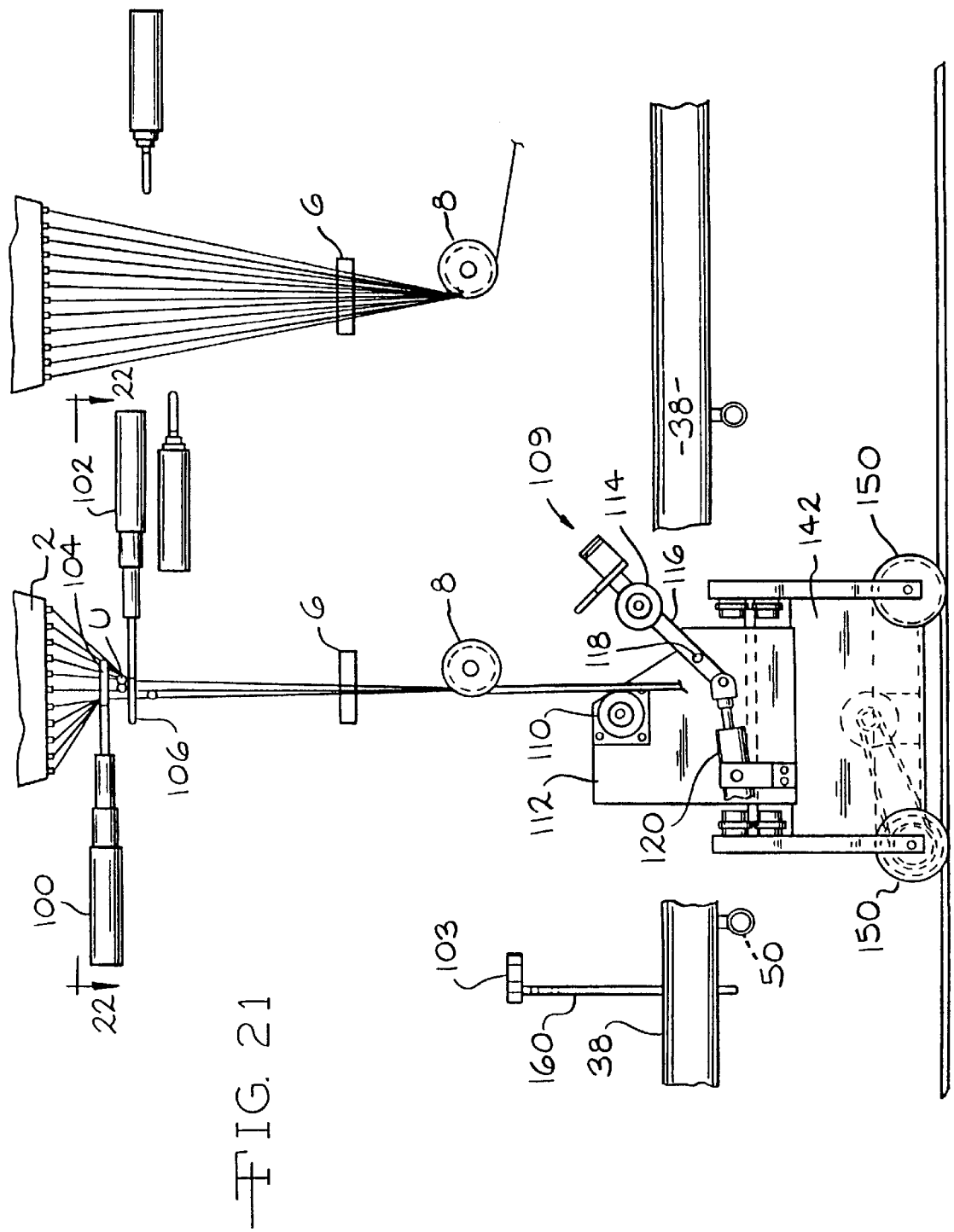
Figure 22:
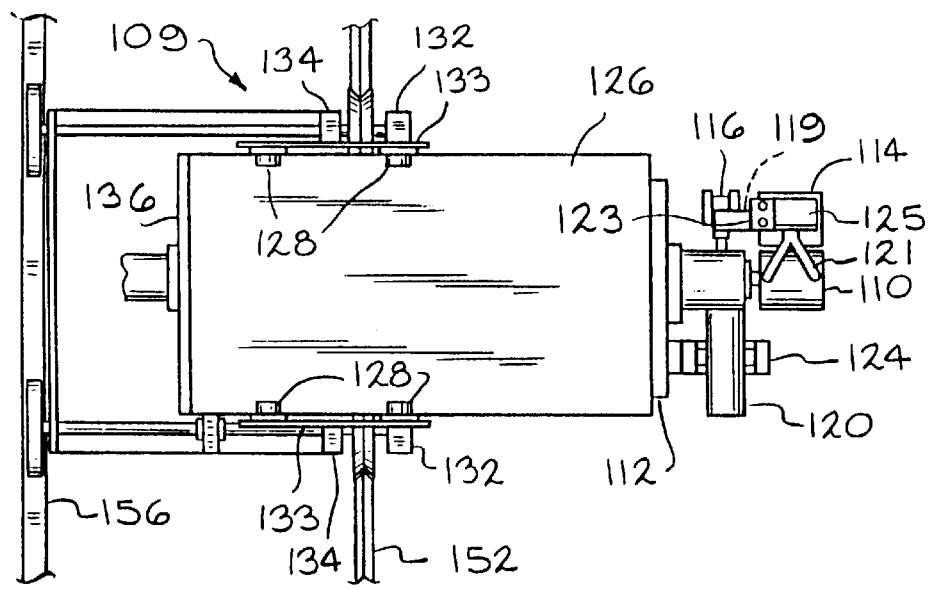
FIGS. 22 and 23 are a plan view and a side view respectively of a portion of the apparatus of the present invention shown in FIG. 14.

After all of the beads have been removed from the tips, cylinders 100 and 102 are energized to move wands 104 and 106 into a position such that the fiber bundle formed in the enclosure formed by the two wands is around or near the vertical centerline of the fiberizing bushing 2 as shown in FIGS. 20 and 21. The bundle of primary fibers will hang generally vertically, but will not be in a tight strand as desired and will wander around a little due to action of the scrap removal equipment in the basement (not shown).

After a predetermined time programmed into the control system, and providing that the strand manipulator 109 and, when using, the carriage 42 are in their proper position at this fiberizer position, the program will activate the drive 111 starting the roller 110 turning and cylinder 138 to extend rolls 110 and 114 respectively to their proper positions 110' and 114' for starting a strand, as shown in FIG. 23. Immediately thereafter the program will activate cylinder 120 which will move roll 114 and the bundle consolidating wand 117 in a radial path by moving arm 116 around its pivot pin 118. The V section 121 of wand 117 will gather the entire bundle of hanging primary fibers, being formed by the two wands 104 and 106 above, and will consolidate the bundle into the base of the wand 117 forming a fiber strand just before the strand is contacted by rolls 110 and 114. As soon as the fiber strand is gripped by the turning roller 110 and the idler roller 114, this roller combination will begin pulling the strand at a speed at least as fast as it was moving downwardly by just hanging.

Figure 24:
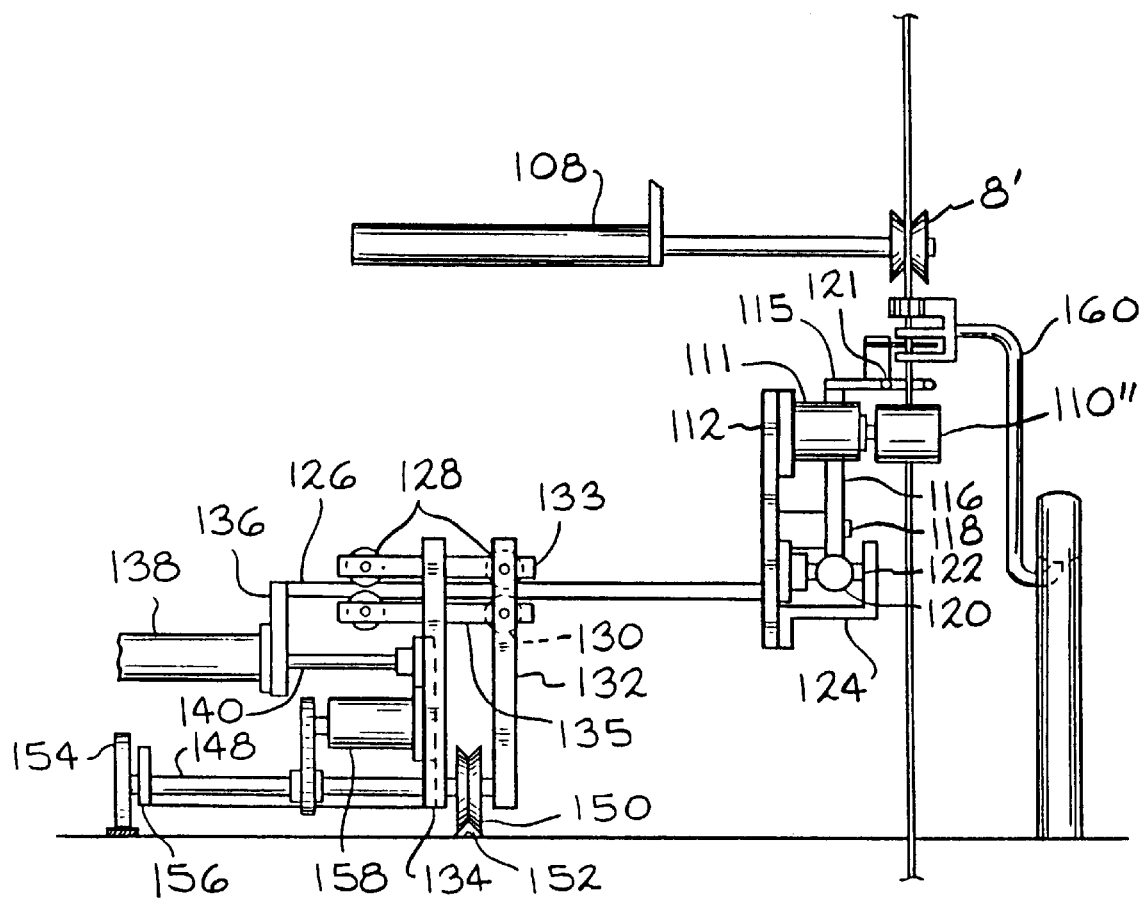
FIG. 24 is a partial side view of the apparatus shown in FIG. 23 showing a strand pulling rolls mechanism, a grabber mechanism and a strand shearing mechanism in a third or strand starting position.

At this time the strand is ready for an operator to take it from the pull rolls, break it and walk it to and start it in the puller or chopper. But when the strand starting apparatus shown in FIGS. 3–6 is used, after a preset time in the controller program, the program will activate cylinders 108 and 138 causing them to extend the rod 140 further to move the pull rolls closer to guide rail 38 to position 114" and to extend pad wheel 8 to position 8' as shown in FIG. 24. The pad wheel position 8' places the valley of pad wheel 8 directly above the path of, or in the plane of, the gripping surfaces of gripper 103. At this time the strand is ready to be grabbed by the gripper 103, so the program activates take up 49 to start carriage 42, arm 160 and gripper 103 moving towards the chopper or puller.

FIG. 25 is a partial vertical front view showing the fiber strand being pulled by rolls 110 and 114 past the base of wand section 121 and the gripper having reached a position where the leading flanges have guided the strand to the gripper surfaces. As the gripper 103 is moved in the direction of the arrow by arm 160 and the carriage 42, the strand will be pulled between the gripping surfaces of the gripper 103 into a position as shown in FIG. 27, these surfaces being spread apart against the spring that biases them together by the movement against the strand which is being pulled down by the rolls 110 and 114. As the gripper 103 continues to move forward the strand below the gripper 103 contacts the sharpened edge of blade 125 and the breaker bars 159 and 107 push the strand around blade 125 causing the strand to break at B as shown in FIG. 27. The strand, having no organic sizing on the coarse primary fibers, breaks quite easily. Note in FIG. 26 that the bars 159 and 107 are short enough to pass by blade holder 123 without interference.

As the gripper 103 carries the strand toward the chopper the strand is pulled into the valley of the pad wheel 8. As the gripper 103 pulls the strand around the pad wheel 8, the program deactivates cylinders 108, 120, 100, 102 and 138 causing the rods to retract in each cylinder which retracts wands 104 and 106 allowing the fibers to assume there normal fan shape, pulls pad wheel 8 into its normal running position which pulls the fan of fibers into contact with the sizing applicator roll 6, moves roll 114 into its open position and withdraws vertical plate 112, and the rolls 110 and 114 back out of the way so that the strand manipulator 109 is in position to move to another bushing position. The gripper 103 will continue pulling the strand along a path as previously described above, releasing the strand onto start up wheel 18 when the surface 105 is pulled against the cam 54 opening the griping surfaces.

FIGS. 28 and 29 show a preferred embodiment of an apparatus for forcing a beaddown and for forming a strand and is used in place of the telescoping cylinders 100, 102, 200 and 202 and the wands 104, 106, 204 and 206 shown in FIGS. 14–21. FIG. 28 also shows three different fiber array configurations in phantom, which three configurations are the configurations formed by the apparatus under each bushing during each debeading and strand forming operation following each fiber breakout on that bushing.

In this preferred embodiment, each of a plurality of double-acting rodless cylinders 208, 210, and 212 are mounted parallel to, and spaced outwardly and below, a first lower long dimensional edge of a bushing 2 mounted in the forehearth or feeder leg of a glass furnace using mounting blocks like those shown at 214, 216, and 218. Each of these blocks are held in place with one or more structural members 219 attached to the supporting steel structure of the furnace (not shown). Typical spacings for the tubes 220, 222, and 212 of cylinders 208, 210 and 212 respectively from the first lower long edge of the bushings are about two feet below and about 6 inches outward, but these spacings can vary considerably so long as the function is satisfied.

Each rodless cylinder has a yoke, 226, 228 and 230, which is driven back and forth on the tubes 220, 222 and 224 respectively with a force exerted by a piston (not shown) inside each tube moving back and forth by fluid pressure, preferably air pressure. The piston is either connected physically to the yoke, or preferably by magnetic attraction, to exert the force on the yoke. Typical of these rodless cylinders are Festo (magnetically coupled) available from Festo Corporation of Hauppauge, N.Y., and Origa (physically coupled) available from Origa Corporation of Elmhurst, Ill.

Fiber array gathering arms 232, 234, and 236 are connected to each of the yokes 226, 228 and 230 respectively in such a way as to extend generally horizontally towards the respective bushing 2 that each of the yokes is adjacent to and each gathering arm extends to a vertical plane that is beyond a second lower long dimensional edge, opposite said first edge on each of the bushings. Each of the gathering arms 232, 234 and 236 are generally V or U shaped and the open end of the V, U, etc. faces a first lower short dimensional edge of each of the respective bushings 2 that the arm will serve. The cross section of the gathering arm is preferably round and only as large as necessary to avoid bending down significantly due to its own weight, but other configurations are suitable. The gathering arms are preferably made of brass, but other materials that will withstand the corrosive atmosphere and heat in this general location of a fiber forming room, e.g. stainless steel, are suitable. When a V shaped gathering arm is used the enclosed angle of the V should be such that fibers coming into contact with the arm will readily slide down to the bottom of the V—a preferred angle is 124 degrees, but other angles are suitable.

Another set of rodless cylinders 238, 240 and 242, supported by mounting blocks 244, 246 and 248 and structural members 253 are located spaced outwardly from said second lower and longer edge of the bushings and spaced further below the bushings than rodless cylinders 208, 210 and 212, preferably just enough to provide clearance between the various elements of the apparatus described above as it operates, as shown in FIGS. 28 and 29. The rodless cylinders 238, 240 and 242 comprise, tubes or cylinders 250, 252 and 254, yokes 256, 258 and 260 and gathering arms 262, 264 and 266 just like the rodless cylinders on the opposite side of the row of bushings 2, except they are oriented to gather the array of primary fibers into a strand from the opposite direction.

A small air line (not shown) enters the end portion of each tube of each rodless cylinder and when air is injected through an air line into one end of a tube, the yoke of that cylinder is moved towards the opposite end of that tube moving the gathering arm connected to the yoke into an array 34 of primary fibers 4 causing the array of primary fibers to be gathered into a strand S. Part or all of the air in the other end of the tube is exhausted out through the air line in that end of the tube—if some is not exhausted, but merely compressed, the yoke will reverse faster to its starting position after the yoke has traveled the desired distance, which is far enough to cause the primary fibers coming from a row of tips next to the tips on the far end of the bushing to contact any beads on the end row of tips on the far end of the bushing. Well known proximity or limit switches are located such as to sense when each yoke is in a desired extreme position, one or more desired intermediate positions and a home position, and to send a signal to close the appropriate fluid valve to stop the yoke in a well known manner. The valves that open and shut to cause fluid, like compressed air, to enter or to vent from the cylinder are not shown, but are conventional, readily available and also well known in the hydraulics field. FIG. 29 and the solid lines of FIG. 28 show the yokes of the rodless cylinders in their home position where they remain until a bushing breaks out and this apparatus is activated.

While the rodless cylinders on each side of the row of bushings are shown aligned in the same horizontal plane and in the same vertical plane, this need not be the case. The rodless cylinders could all be on different horizontal planes and/or on different vertical planes or any combination of positions if desired so long as the function described here for the rodless cylinders was maintained. The bushings could be oriented ninety degrees differently in the horizontal plane, i. e. with the long lower edges of the bushing facing those of adjacent bushings instead of the short lower edges facing each other as shown here, and the rodless cylinders could also be rotated ninety degrees in the horizontal plane. Also, the rodless cylinders need not be horizontal or exactly parallel to the edge of the bushing as this concept would work with the cylinders on cocked, so perfect alignment is not necessary. It is important on fin shield and cooling tube type bushings that the direction of travel of the yokes and gathering arms be parallel to the fins or cooling tubes to avoid moving the fibers into contact with the fins or cooling tubes while gathering which would often break out fibers. Also, the rodless cylinders could be replaced with rods or tubes like 220, etc. and yokes like 226, etc. and arms like 232, etc. with each yoke attached to an external motive source like a conventional fluid powered cylinder on rack and motor drive.

This preferred embodiment of the apparatus to accelerate debeading of the bushing and to form a strand of the array of primary fibers just described above operates on each bushing position independently as follows. When an operator or sensing system senses that a bushing has broken out and needs restarting either the operator or the control system starts the following sequence of events. Referring to left side of FIG. 28, a fluid valve is activated to allow air (or other fluid) to enter the portion of the interior of tube 254 near block 246 which moves yoke 260 and gathering arm 266 to cause the arm to contact the hanging array 34 of primary fibers 4 and to cause them to slide into the bottom of the V to form a strand S at position F when the yoke and arm reach the extreme position shown in dotted lines near mounting block 248. In this position, the fibers will contact any beads formed on an adjacent tip in the direction that the yoke 260 was moving and when primary fibers are again allowed to move in the opposite direction, the fibers contacting glass beads will pull the beads off of the tips pulling a fiber behind each bead, thus starting those beaded tips. When the yoke reaches this position, the fibers 4 are gathered into a strand near the plane between blocks 214 and 248 (as shown at F in the adjacent position),a proximity sensor (not shown) senses the position of the yoke 260 or arm 266 and shuts off the air (or other fluid) going into the tube 254 portion near block 246 and opens valves allowing air to enter the portions of tubes 254 near block 248 and 220 near block 214. This moves yoke 260 and arm 266 back to its home base where another proximity sensor (not shown) senses the yoke or arm and shuts off the air flow to the tube 254, stopping the yoke 260. At the same time the air entering tube 220 moves yoke 226 and gathering arm 232 towards block 216, gathering the array 34 of fibers 4 and forming them into a strand at the bottom of the V of the arm reaching a configuration and strand position as shown at G in FIG. 28, but near the plane between blocks 216 and 246. When this position is reached, a proximity sensor (not shown) shuts off the air flow to tube 220 near block 214 and opens a valve allowing air to enter tube 220 near block 216, reversing the movement of yoke 226 and arm 232.

If the control system is set for more than one cycle of debeading, another valve will open allowing air to enter tube 254 near block 246, yoke 226 will move until it reaches home base where a proximity switch will stop air flow into tube 220 near block 216 and the cycle just described will repeat itself, as just described above, as many times as is programmed.

When the desired number of debeading cycles have been completed and the yoke 226 is in the position to form a strand as shown at position G, but near block 216, a valve allowing compressed air to enter the portion of the tube 220 near block 216 opens and at the same time a valve opens allowing air to enter a portion of the tube 254 near block 246. This moves yoke 226 and arm 232 until the bottom of the V of the arm 232 is about midway through the array 34 of fibers 4 and moves yoke 260 and arm 266 until the bottom of the V of the arm 266 is about midway through the array 34 of fibers 4, i. e. into positions forming a strand as shown at H in FIG. 28, but between blocks 214 and 216 and between blocks 246 and 248 respectively. Proximity sensors (not shown), which were activated when the desired number of debeading cycles was completed, senses the yokes 226 and 260, or arms 232 and 266, when they are in these respective positions and shuts the appropriate air valves and vents the compressed air in the tubes to hold the yokes and arms in these positions.

The strand is now in position and ready for the operator, a person, to take charge of, or for a set of pull rolls like the rolls 110 and 114 (see FIGS. 22 and 23) to engage and pull the strand S. When the operator will start the strand, he will manually hit a switch (not shown), once he has hold of the strand S, which will open the appropriate valves to move yokes 226 and 260 back to their home positions as shown in FIG. 29 and where they await the next fiber breakout. When an apparatus like the strand manipulator 109 of FIG. 21, etc. is used, the valves for moving yokes 226 and 260 back to their home positions can be activated by a proximity switch (not shown) which senses that the pull rolls 110 and 114 are in the proper position for engaging the strand S.

A preferred way of operating this bushing debeading and strand forming apparatus is to leave yoke 260, after the desired number of debeading cycles has been completed, in its home position until the operator is in place and engages a switch or until the strand manipulator has arrived under that bushing position since the primary fiber array will hang much better in that position than when the yokes are in a position to form the strand S, as shown at H in FIG. 28. Yoke 226 can proceed to the position it is in to form strand S as shown at H or can return to its home position until the operator is in place and engages a switch or until the strand manipulator has arrived under that bushing position. The bushing debeading and strand forming devices described above are also equipped with a lockout circuit on each bushing position to enable maintenance on the bushing position without interference from the device.

It will be apparent to those skilled in the art that modifications can be made to this equipment and the methods using this or equivalent apparatus, such as using different kinds of gripper means, different kinds of strand breaking means, different shaped gathering arms, different means for guiding and moving the strand, different strand puller means, different means for pulling the gripper back and forth and other changes such as changing some of the non critical sequence of events without significantly changing the process or the results. It will also be apparent to those skilled in the art that the timing of activation of the valves that manipulate the various fluid cylinders that are described herein can be modified from the above description to decrease or increase the debeading elapsed time and/or the strand starting elapsed time.

It will also be apparent to those skilled in the art that where the fiberizing bushings or rows of fiberizing tips, with their corresponding cooling tubes or fins, are oriented differently than illustrated here, it may be preferable to locate cylinders 100, 102, 200 and 202 in a different plane and/or such that their axial center lines intersect the plane of the center line of the row of bushings. Also, while the guide rail 38, arm 160 and gripper 103 are on one side of the fiber arrays and the strand manipulator 109 is shown on the opposite side of the fiber arrays, it will be apparent to one skilled in the art to modify the apparatus to locate all on the same side of the fiber arrays, or various other combinations. Also, the cylinder holding the turning wheel 8 can be located on the same side of the bushing as guide rail 38. By replacing the chopper with a roving winder, the invention can be used to automatically start strands into the roving winder. Other modifications or configurations will be apparent to those skilled in making continuous fiber products without changing the basic concepts disclosed herein.

We claim:

1. Apparatus for use in a process of making continuous strand products comprising:
   a) a fiber forming bushing for forming an array of primary fibers,
   b) wands or gathering arms for gathering the array of hanging primary fibers flowing slowly from the fiber forming bushing, each wand or gathering arm being U or V shaped for forming the gathered primary fibers into a bundle of primary fibers, each wand or gathering arm having an opening for the array of primary fibers, the opening being at least as wide as the width of the array of primary fibers,
   c) movable supports for the wands, which supports allow the wands to move back and forth to contact the array of primary fibers, and
   d) means for moving said supports.

2. The apparatus of claim 1 wherein the fiber is glass fiber, the wands or gathering arms are V shaped and the apparatus further comprises a puller for said strand of primary fibers.

3. The apparatus of claim 2 further comprising a gripper for gripping a strand of fibers, said gripper being movable from the vicinity below and adjacent any bushing to the proximity of a strand starting position of a strand puller, transporting means for moving said gripper to the proximity of said puller and back below and to the side of a vertical projection of any bushing or to a home position, a guide for guiding said gripper along a predetermined path that runs from a home position, below and to the side of bushings and to the proximity of said starting position of said puller, a deactivator for causing said gripper to release said strand in the proximity of said puller such that said strand will be contacted in a pulling manner by said puller, and a control system including sensors for detecting the location of the gripper, switches and a program to control the movements and location of said gripper.

4. The apparatus of claim 2 wherein said wands for gathering are supported by cylinder elements for moving said array with at least one of said wands first towards one end of the bushing and then with another of said wands towards the opposite end of the bushing to pull down any beads still hanging on the bushing.

5. The apparatus of claim 4 wherein said primary fiber strand puller comprises a set of movable pull rolls with at least one of the rolls being driven and at least one of the rolls having means for moving said roll into and out of contact with the other roll and means for moving said rolls into a position to contact and pull said strand and later to return said rolls to a location out of the path of said fiber array.

6. The apparatus of claim 5 wherein said means for moving said pull rolls further comprise means for moving said strand into the path of a moving strand gripper.

7. The apparatus of claim 6 further comprising at least one member of a strand breaking means.

8. The apparatus of claim 4 wherein the cylinder elements comprise at least one rodless fluid cylinder.

9. The apparatus of claim 1 further comprising a gripper for gripping a strand of fibers, said gripper being movable from below and adjacent a vertical projection of any bushing to a strand starting position of the strand puller, a transporter for moving said gripper to the starting position of said puller and back to below and adjacent a vertical projection of any bushing or to a home position, a guide for guiding said gripper along a predetermined path with the home position on one end and the starting position on the other end and areas below the bushings in between, a deactivator for causing said gripper to release said strand at the starting position of said puller such that said strand will be contacted in a pulling manner by said puller, a control system that includes sensors for detecting the location of said gripper, switches and a program to control the movements and location of said gripper.

10. The apparatus of claim 1 wherein the opening in each wand or gathering arm is significantly wider than the width of the fiber array.

11. The apparatus of claim 1 wherein the movable supports comprise at least one rodless fluid cylinder.

12. The apparatus of claim 11 wherein the fibers are glass fibers.

* * * * *